(12) United States Patent
Allor

(10) Patent No.: US 7,308,678 B2
(45) Date of Patent: Dec. 11, 2007

(54) WIZARD FRAMEWORK

(75) Inventor: Jason Allor, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 10/346,884

(22) Filed: Jan. 15, 2003

(65) Prior Publication Data

US 2004/0135802 A1 Jul. 15, 2004

(51) Int. Cl.
*G06F 9/44* (2006.01)
(52) U.S. Cl. .................. 717/111; 717/109; 717/113
(58) Field of Classification Search ......... 717/106–118
See application file for complete search history.

(56) References Cited

U.S. PATENT DOCUMENTS

| | | | |
|---|---|---|---|
| 5,966,532 A * | 10/1999 | McDonald et al. ......... 717/105 |
| 6,564,375 B1 * | 5/2003 | Jiang .......................... 717/165 |
| 6,602,234 B2 * | 8/2003 | Klemp et al. .......... 604/385.01 |
| 2003/0048300 A1 * | 3/2003 | Li .............................. 345/762 |

OTHER PUBLICATIONS

Li, "A survey on Microsoft Component-based Programming Technologies", Concordia University, Canada, pp. i-vi, 1-146, 1999.*
"IUnknown::QueryInterface," *MSDN Library*, Oct. 2002, <http://www.msdn.microsoft.com/library/en-us/multimed/mmintrfc_3jtx.asp?frame=true> [retrieved Jan. 16, 2003].
"QueryInterface: Navigating in an Object," *MSDN Library*, Oct. 2002, <http://www.msdn,microsoft.com/library/en-us/com/com_02b8.asp?frame=true> [retrieved Jan. 16, 2003].

* cited by examiner

*Primary Examiner*—Ted T. Vo
(74) *Attorney, Agent, or Firm*—Christensen O'Connor Johnson Kindness PLLC

(57) ABSTRACT

The information exchanging facility is used by one wizard page to request the information it needs although it need not know where the information may have come from. This allows wizard pages that have already been developed in one wizard to be reused and placed into new wizards. This information exchanging facility is part of an architectural software framework that aids in the design of an interactive help utility, such as a wizard, that guides a user through steps of a particular task.

36 Claims, 14 Drawing Sheets

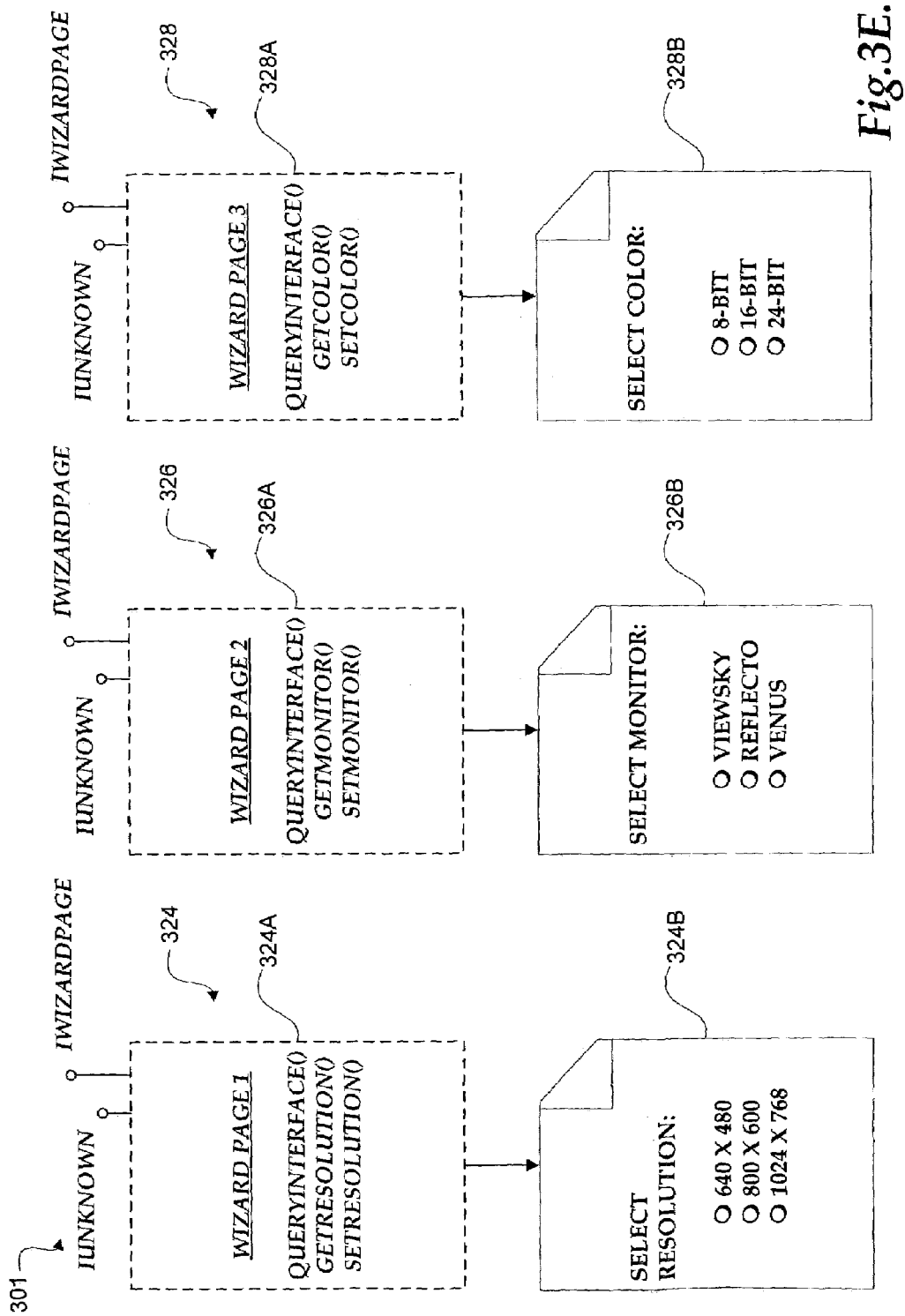

WIZARD FRAMEWORK

FIELD OF THE INVENTION

The present invention relates generally to an architectural software framework, and more particularly, to the design of an interactive help utility, such as a wizard, that guides a user through steps of a particular task.

BACKGROUND OF THE INVENTION

A wizard consists of multiple wizard pages that a user progresses through by clicking on the Next or Back buttons. Each wizard page of the wizard provides some information to the user to guide him through a subset of tasks necessary to complete a larger task. Wizards are used very commonly within graphical user interface (hereinafter "GUI") operating systems and by hundreds of applications that run in these operating systems.

FIG. 1 illustrates an interactive help utility called a wizard 100, which appears as a modal window, within an application. The wizard generates windows that guide a user through each step of a particular task, such as starting up a word processing document in the correct format for a business letter. The GUI window of the wizard 100, like other window applications, includes a title bar 102, which is a horizontal space at the top of a window that contains the name of the window. Appearing as a square button in the right corner of the title bar 102 with an X mark on it is a Close button 104. Clicking on the Close button 104 cancels the wizard 1100. The wizard 100 also includes a number of screens 106, 108, and 110 that present information and receive input (information) from a user during the performance of the task defined by the wizard. The screens 106-110 may be navigated back and forth using a back button 112 or a next button 114. After collecting sufficient information from a user, the wizard 100 presents a Finish button 115. A user clicking the Finish button causes the wizard 100 to proceed to perform the wizard's task. At any point, a user may exit from the wizard 100 by clicking on a Cancel button 116. Clicking on the Cancel button causes the wizard 100 to quit and returns the user to the application that originally invoked the wizard 100.

Traditionally, the process of creating a wizard can be laborious and somewhat tedious. Here are typical development steps: First, the developer creates a main user interface that will host all of the wizard pages of the wizard. Second, the developer creates a user interface for each page of the wizard as well as writes the code to handle each page. Third, the developer has to come up with a mechanism for placing each page onto the main user interface of the wizard. And the mechanism should be cognizant that the presentation of these pages has to be in the correct order. In complicated wizards, the order of the pages might change based upon a user's selections. Thus, the mechanism needs to be able to handle this ordering of the pages. An additional mechanism is created by the developer to allow various pages of the wizard to communicate with one another and pass data back and forth. Then, the developer creates another mechanism for launching and displaying the wizard. And finally, the developer designs a process that launches the wizard and another process to receive the results of users' input from all the wizard pages of the wizard.

This toilsome effort for creating a wizard is repeated anew with each new wizard. Given that many software products make extensive use of wizards, a significant and therefore costly amount of developing time and money is be spent by software manufacturers to develop wizards. One glaring problem is that the conventional approach to create wizards precludes easy reusability of existing components or elements of wizards.

To allow wizard pages of a wizard to communicate with one another and pass data back and forth, each wizard page of a wizard is tightly coupled to a database where data is shared. To use the database, each wizard page of the wizard must intimately know all the data that can be written to or read by the other wizard pages. Otherwise, one wizard page could mistakenly access and change data in the wrong place in the database resulting in the corruption to the rest of the wizard pages of the wizard and possibly detrimental repercussions to the wizard itself. Unfortunately, this requirement results in the data in a database being vulnerably exposed by necessity to all of the wizard pages of the wizard. Not only does this present a serious security problem but it also inhibits reusability. The reason for this is because a wizard designer would have to be intimately familiar with the relationship between data among wizard pages. This familiar intimacy is a time-consuming undertaking, and it may also hinder the efficiency of designing and improving wizards.

All wizard pages of a wizard and their corresponding pieces of code are designed specifically to run without regard to how the pages and corresponding pieces of code can be reused. Conventional wizards are specific to the software products for which they are designed. For example, different software teams within a software company would design different means for transferring data between pages of wizards. Moreover, wizards may look slightly different from one another lacking unity in presentation to consumers. For example, placement of user interface elements, such as title bars, pictures, and buttons, might be differently placed and functions of the user interface elements might diverge from one another.

Thus, there is a need for an architectural software framework for designing wizards that incorporates protocols and means for expansion and interfacing among pages of wizards, as well as a reusable basic programming structure that assists in building wizards, while reducing or avoiding the foregoing and other problems associated with existing wizards.

SUMMARY OF THE INVENTION

In accordance with this invention, a system, method, and computer-readable medium for facilitating the exchange of information among components of an interactive help utility is provided. The system form of the invention comprises a wizard for guiding a user through a task. The wizard includes a first wizard page previously presented to the user. The first wizard page includes a set of services for accessing stored information provided by the user. The wizard further includes a second wizard page to be presented to the user. The second wizard page queries the wizard to gain access to the set of services and in response the wizard queries the first wizard page. The first wizard page returns a reference to the set of services and allows the second wizard page to access the stored information for customizing the presentation of the second wizard page to the user.

In accordance with further aspects of this invention, another system form of the invention comprises an interactive help utility for guiding a user through a task. The interactive help utility includes a wizard base that includes a history of previously presented wizard pages. The wizard base further includes a query service for querying the previously presented wizard pages to obtain a desired interface to access stored information previously provided by the user. The interactive help utility further includes a wizard page to be presented to the user. The wizard page invokes the query service of the wizard base to gain a reference to the desired interface thereby allowing access to the stored information for customizing the wizard page prior to presentation to the user.

In accordance with further aspects of this invention, a further system form of the invention comprises a computer-implemented architectural software framework for facilitating the exchange of information among components of an interactive help utility. The architectural software framework includes a wizard class for defining the order in which to display wizard pages. The wizard class includes a query service for returning a set of services that the wizard class supports. The architectural software framework further includes a wizard page to be presented to the user. The wizard page desires execution of an access service of other wizard pages to obtain stored information to customize the wizard page. The architectural software framework as yet further includes a wizard base that includes a query service for querying presented wizard pages to obtain the access service. The query service of the wizard base is invokable by the wizard page to find the access service. The query service of the wizard base invokes the query service of the wizard class to find the access service if the access service cannot be found among the presented wizard pages.

In accordance with further aspects of this invention, the method form of the invention for facilitating the exchange of information among components of an interactive help utility to guide a user through a task is implementable in a computer system. The method comprises querying a wizard base by a wizard page for an access service to access stored information so as to customize options presented by the wizard page to the user. The method further comprises invoking the access service by the wizard page to access the stored information when a reference to the access service is found by the wizard base by querying previously presented wizard pages for the reference to the access service.

In accordance with further aspects of this invention, the method form of the invention for exchanging information in a wizard is implementable in a computer system. The method comprises storing in a history a first wizard page previously presented to a user. The first wizard page includes a set of services for accessing stored information provided by the user. The method further comprises querying the wizard by a second wizard page that is to be presented to the user. The second wizard page queries the wizard to gain access to the set of services and in response to the query of the second wizard page the wizard querying the first wizard page. The first wizard page returns a reference to the set of services allowing the second wizard page to access the stored information for customizing the presentation of the second wizard page to the user.

In accordance with further aspects of this invention, another method form of the invention for exchanging information in an interactive help utility is implementable in a computer system. The method comprises storing previously presented wizard pages in a history by a wizard base. The wizard base includes a query service for querying the previously presented wizard pages to obtain a desired interface to access stored information previously provided by the user. The wizard base queries the wizard base by a wizard page that is to be presented to a user. The wizard page invokes the query service of the wizard base to gain a reference to the desired interface thereby allowing access to the stored information for customizing the wizard page prior to presentation to the user.

In accordance with further aspects of this invention, a further method form of the invention for facilitating the exchange of information among components of an interactive help utility is implementable in a computer system. The method comprises loading a wizard class that defines the order in which to display wizard pages. The wizard class includes a query service for returning a set of services that the wizard class supports. The method further comprises loading a wizard page to be presented to the user. The wizard page desires the execution of an access service of other wizard pages to obtain stored information to customize the wizard page. The method yet further includes querying a wizard base by the wizard page. The wizard base includes a query service for querying presented wizard pages to obtain the access service. The query service of the wizard base is invokable by the wizard page to find the access service. The query service of the wizard base invokes the query service of the wizard class to find the access service if the access service cannot be found among the presented wizard pages.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3E is a block diagram illustrating a wizard formed from a number of wizard pages instantiated from the architectural software framework;

DETAILED DESCRIPTION OF THE PREFERRED EMBODIMENT

Figure 1:
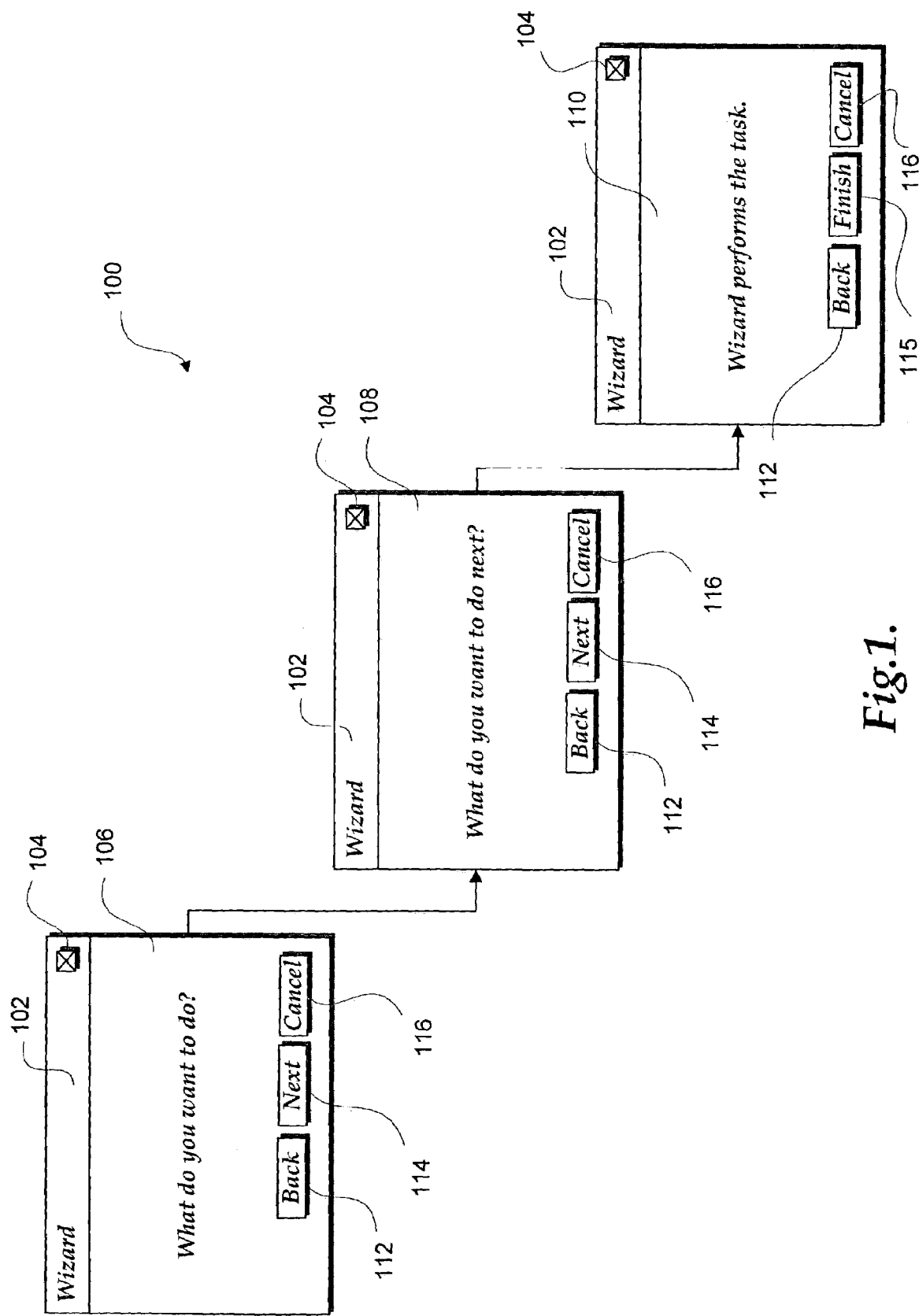
FIG. 1 is a block diagram illustrating a conventional wizard.
Figure 2:
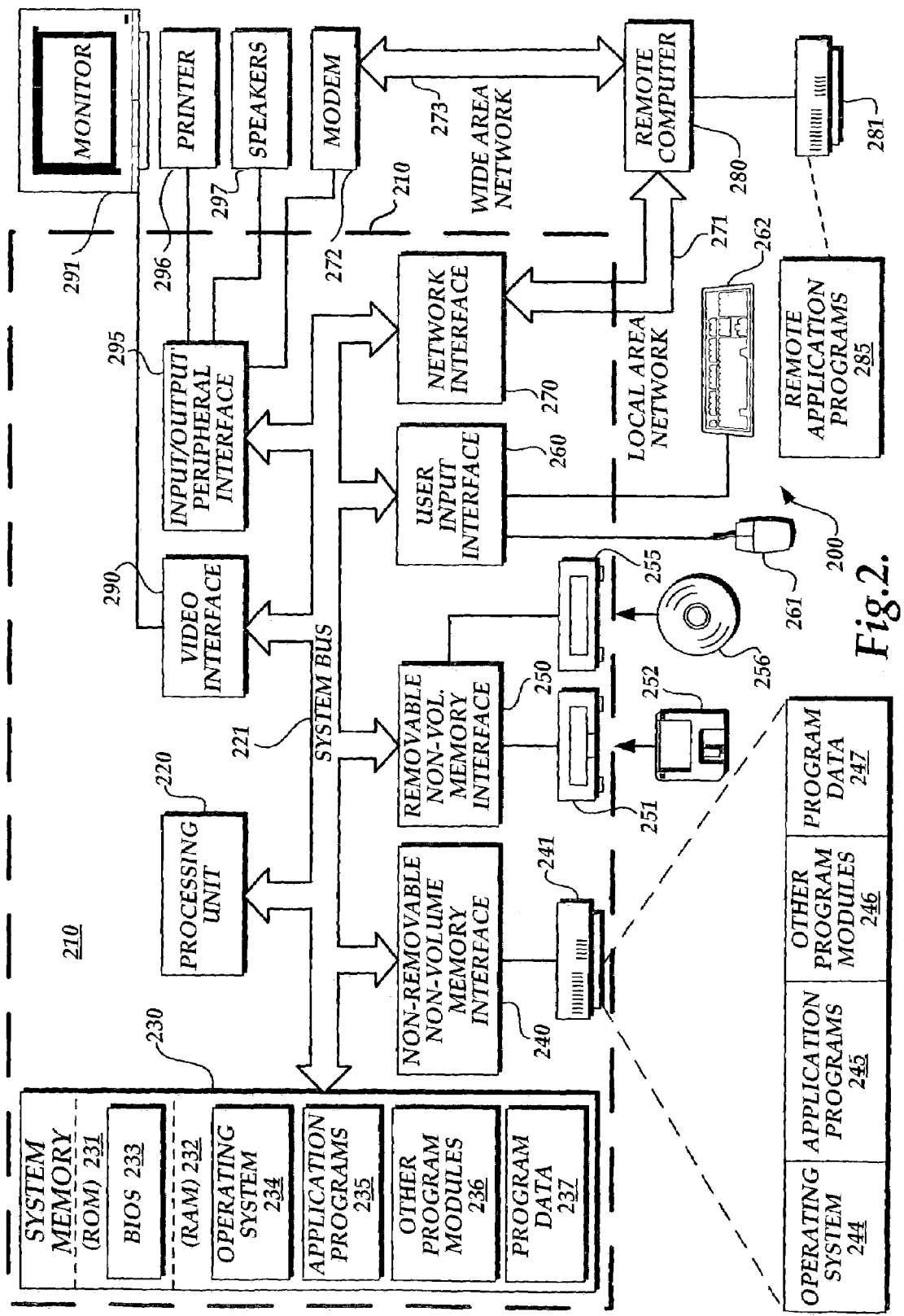
FIG. 2 is a block diagram illustrating an exemplary computing device.

FIG. 2 illustrates an example of a computing system environment 200 suitable for practicing certain aspects of the invention, such as facilitating the exchange of information among components of interactive help utilities. The computing system environment 200 is only one example of a suitable computing environment and is not intended to suggest any limitation as to the scope of use or functionality of the invention. Neither should the computing environment 200 be interpreted as having any dependency or requirement relating to any one or combination of the illustrated and described components.

The invention is operational with numerous other general purpose or special purpose computing system environments or configurations. Examples of well-known computing systems, environments and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described in the general context of computer-executable instructions, such as program modules being executed by a computer. Generally, program modules include routines, programs, objects, components, data structures, etc. that perform particular tasks or implement particular abstract data types.

The invention may also be practiced in distributed computing environments where tasks are performed by remote processing devices that are linked through a communications network. In a distributed computing environment, program modules may be located in both local and remote computer storage media, including memory storage devices.

The computing system environment illustrated in FIG. 2 includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures, including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 210 typically includes a variety of computer-readable media. Computer-readable media can be any available media that can be accessed by computer 210 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other computer storage media. Communication media typically embody computer-readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF infrared, and other wireless media. A combination of any of the above should also be included within the scope of computer-readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates the hard disk drive 241 that reads from or writes to non-removable, nonvolatile magnetic media, the magnetic disk drive 251 that reads from or writes to a removable, nonvolatile magnetic disk 252, and an optical disk drive 255 that reads from or writes to a removable, nonvolatile optical disk 256, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 241 is typically connected to the system bus 221 through a non-removable memory interface, such as interface 240, and the magnetic disk drive 251 and optical disk drive 255 are typically connected to the system bus 221 by a removable memory interface, such as interface 250.

The drives and their associated computer storage media discussed above and illustrated in FIG. 2 provide storage of computer-readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices, such as a keyboard 262 and pointing device 261, the latter of which is commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port, or universal serial bus (USB). A monitor 291 or other type of display device is also connected to the system bus 221 via an interface, such as a video interface 290. In addition to the monitor, computers may also include other peripheral output devices, such as speakers 297 and printer 296, which may be connected through an input/output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such network environments are commonplace in offices, enterprise-wide computer networks, intranets, and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the input/output peripheral interface 295, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are for illustrative purposes only and other means of establishing a communication link between the computers may be used.

As an illustration for the desire to exchange information among components of the architectural software framework 300 (FIG. 3A), consider a wizard in a word processor application that allows a user to generate a letter template which includes the date, addresses of the sender and receiver, greetings, and closing statements. Such a wizard may include multiple pages where each page would be designed to allow the user to set up a portion of the letter. For example, the first wizard page might let the user choose the format for the date. The second wizard page might allow the user to choose whether the letter is formal or informal in presentation. If the user specifies that the letter is to be formal, the next wizard page that appears should allow the user to enter the address of the person receiving the letter. Otherwise, if the letter is informal, this wizard page can be skipped. Because the wizard class determines which wizard page appears next, the wizard class can retrieve information from the appropriate wizard page, such as the second page, to determine whether the user wants a formal or informal letter. The final wizard page might allow the user to enter a closing statement of the letter. If the letter is formal, this final wizard page may suggest a formal closing statement. Otherwise, if the letter is informal, the final wizard page will suggest instead an informal closing statement. Thus, this final wizard page would also need to query an earlier page (in this case, the first wizard page) to determine whether or not the user desires a formal or informal letter.

Various embodiments of the present invention provide a facility for querying for information so as to exchange information among wizard pages. For example, consider that the first wizard page (the wizard page in which the user picks informal or formal letter style) implements an interface called ILetterType. This interface has two methods, setFormal() and getFormal(). The setFormal() method allows write access to stored information pertaining to informal or formal letter style. The getFormal() method allows read access to the same stored information. In order for the final wizard page (the wizard page in which the user picks a closing statement) to suggest an appropriate closing statement, the final wizard page needs to access the stored information that pertains to the informal or formal letter style. Because the stored information is encapsulated by the ILetterType interface, the final wizard page needs to have a reference (such as a pointer) to the ILetterType interface, and invoking the getFormal() method of the ILetterType interface to access the stored information pertaining to the informal or formal letter style.

The difficulty involves where the final wizard page is to obtain the ILetterType interface. It turns out (as discussed in detail below) the final wizard page cares not where the ILetterType interface comes from as long as the ILetterType interface is implemented and such an interface can be obtained via a facility for querying for information so, as to exchange information among wizard pages. This facility is discussed in greater detail below. Moreover, when the wizard has completed its task, an application can gather all of the information entered by the user on all of the wizard pages so that the application can further process the task in the manner specified and desired by the user.

Figure 3A:
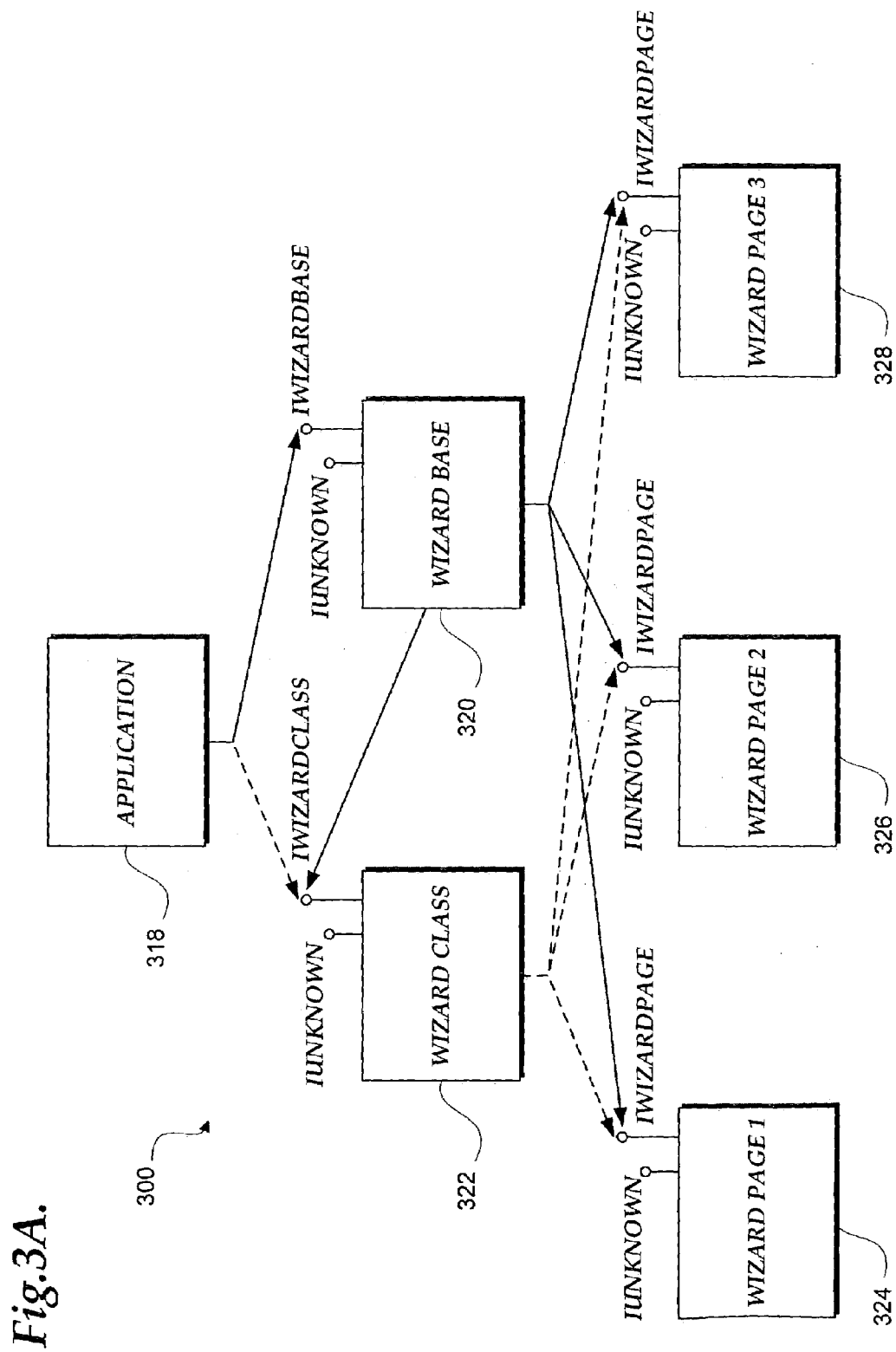
FIG. 3A is a block diagram illustrating components of an architectural software framework to design interactive help utilities, and particularly, these components include a wizard base, a wizard class, and wizard pages.

FIG. 3A illustrates an architectural software framework 300 for creating wizards that incorporate exchanging protocols and means for expansion and interfacing among pages of wizards, as well as a reusable basic programming structure that assists in building wizards. The architectural software framework allows wizards to be created without having to remake, redo completely, or to make as if for the first time those components of a wizard that have already been implemented. Pages of a wizard instantiated from the architectural software framework 300 can be reused on wizards other than the one for which they were originally designed. The architectural software framework 300 lets a developer focus those parts of a wizard that he feels is pertinent to, his implementation.

An application 318, which is a program designed to assist in the performance of a specific task, such as word processing, spreadsheet, or crafting visual diagrams, is not part of the architectural software framework 300. However, the application 318 is shown coupled to the architectural software framework 300 to signify that wizards can be invoked from within applications, such as the application 318. Components of the architectural software framework 300 are coupled together either by solid lines or dashed lines that terminate to a wedge-shaped piercing tip resembling an arrowhead. A solid line symbolizes an active invocation order from one component to another component. For example, the application 318 directly invokes a wizard base 320. A dashed line indicates that one component has a reference to another component. For example, the application 318 has a reference to a wizard class 322. The term "reference" means the inclusion of a pointer, which is a variable that contains the memory location (address) of some data, or a reference, which is an alias for a variable that actually stores the address of the variable.

Solid lines and dashed lines begin from one component of the architectural software framework 300 and end at a projection of another component. These projections have a circular terminus to represent an interface of a component. For example, the wizard base 320 has the interface IWizardBase. Each interface can be considered as an application programming interface of a particular component of the architectural software framework 300. Each interface has one or more methods that can be invoked by another component to access the services offered by the invoked component. The application 318 is not a component of the architectural software framework 300, and therefore, it lacks the interface shown on other components of the architectural software framework 300.

Each interface in each component of the architectural software framework 300 includes an IUnknown interface. The IUnknown interface is shown separate from the other interface of a component via a second projection that ends with the circular terminus. The interface IUnknown need not be programmatically separated from the other interface of a component but is shown separately here for clarity purposes (as explained in detail below). The IUnknown interface of a called (or invoked) component includes a QueryInterface() method that returns back to a calling component not only an interface supported by the called component but potentially other interfaces of other components programmatically known to the called component (explained in greater detail below). Conventional QueryInterface() method returns only those interfaces directly supported by the called component. Any suitable technology or languages can be used to implement the IUnknown interface. One suitable technology includes Component Object Model (COM). But other suitable technology is also possible, such as the remoting facility of Microsoft's .NET™ or Sun Microsystems' Java-Bean™.

The architectural software framework 300 includes the wizard base 320. The wizard base 320 manages the displaying of wizard pages of a wizard and the exchange of data among wizard pages and other components, among other things. The main interface of the wizard base 320 is the IWizardBase interface.

The wizard class 322 is another component of the architectural software framework 300 that programmatically defines one particular wizard. In essence, the wizard class 322 describes a collection of wizard pages of a wizard that are to be presented together in a consistent fashion to a user. The main task of the wizard class 322 is to ensure that pages of the wizard are presented in a proper order. The wizard class 322 has an IWizardClass interface.

A number of pages 324-328, which include "wizard page 1," "wizard page 2," and "wizard page 3," collectively represent the wizard pages to be presented to a user for guiding the user through steps of a particular task. While each set of methods of functions of the pages 324-328 contains similar methods declared by the IWizardPage interface, each page may implement its own interface for data storage such that set of methods of functions of one page is different than another page. This is because information collected or presented to a user on one page of a wizard is likely to be different from another page of the same wizard. As noted above, and as will be discussed fully below, each method QueryInterface() eases the exchange of information of the architectural software framework 300.

Each component shown in FIG. 3A is an abstract data structure, which is instantiated by a developer during the process of creating a wizard. Certain components of the architectural software framework 300, such as the wizard pages 324-328, contain the broad structure and generic programming code that is intended to be filled out and specialized for a particular wizard built by a developer.

Figures 3B, 3D:
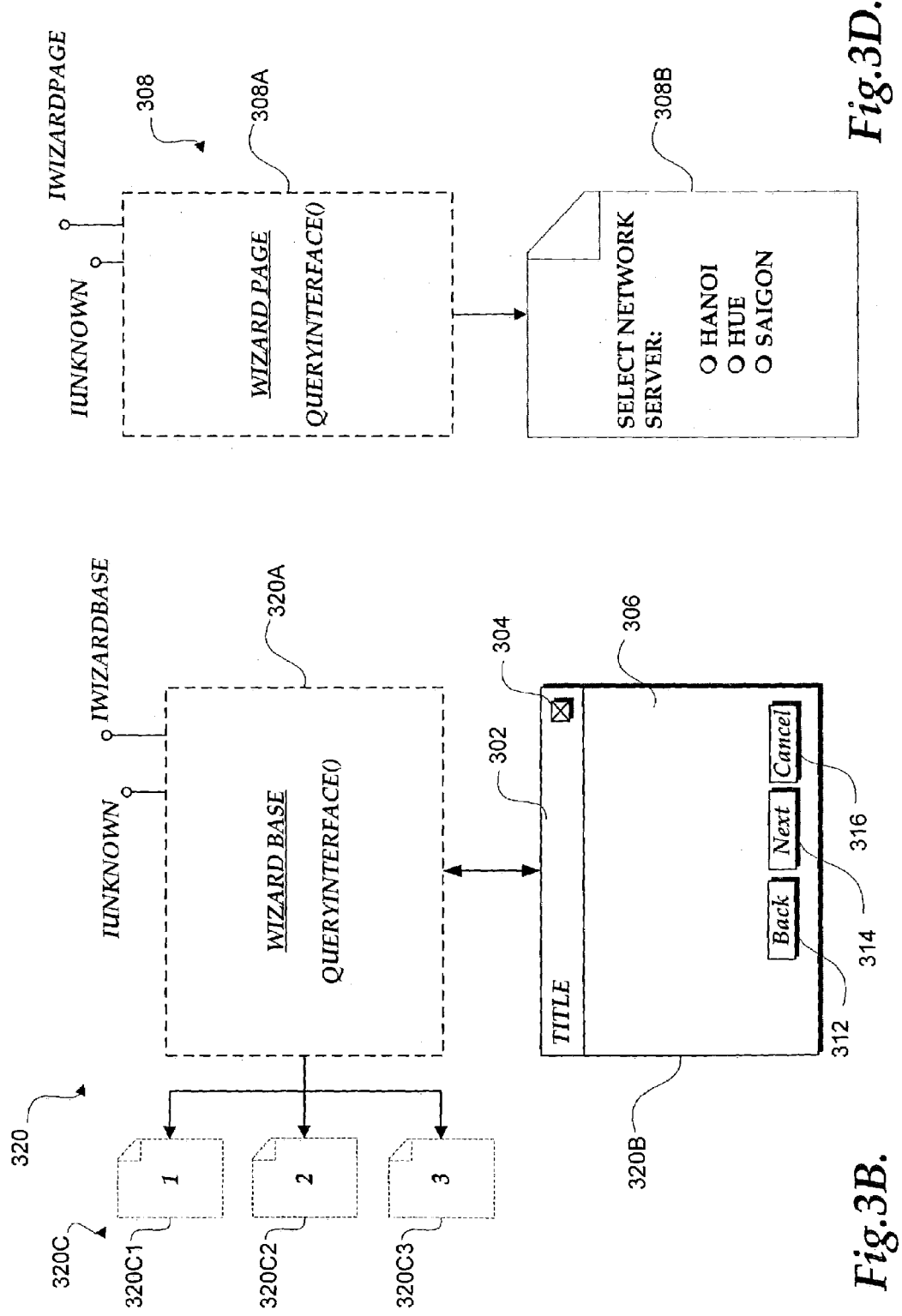
FIG. 3B is a block diagram illustrating an exemplary wizard base component instantiated from the architectural software framework, which includes a user interface portion, a code portion, and a history portion.
FIG. 3D is a block diagram illustrating an exemplary wizard page component instantiated from the architectural software framework.

The wizard base 320 is shown in greater detail in FIG. 3B. Two programmatic portions comprise the wizard base 320. A user interface portion 320B contains user interface elements that are likely to be present in most wizards. For example, the user interface portion 320B includes a title bar 302 which lies horizontally at the top of a window that contains the name of the wizard. Appearing as a square button in the right corner of the title bar 302 with an X mark on it is a Close button 304. Clicking on the Close button 304 cancels the wizard. Wizard pages, which present information and receive input (information) from a user during the performance of the tasks defined by the wizard, are placed in an area 306. These pages of the wizard may be navigated back and forth using a Back button 312 or Next button 314. After collecting sufficient information from a user, the wizard presents a Finish button (not shown). A user clicking the Finish button causes the wizard to proceed to perform the wizard's task. At any point, a user may exit from the wizard by clicking on a Cancel button 316. Clicking on the Cancel button 316 causes the wizard to quit and returns the user to the application 318 that originally invoked the wizard.

The other part of the wizard base 320 is a code portion 320A. The code portion 320A manages the displaying of various pages of a wizard and the exchange of data among these pages as well as other components of the architectural software framework 300. As pages are displayed in the area 306 of the user interface portion 320B, the wizard base 320 keeps a history of presented wizard pages in yet another part of the wizard base 320—a history portion 320C. The history portion 320C comprises a list of previously displayed wizard pages, such as pages 320C1-320C3. By using the history portion 320C, the wizard base 320 can access any wizard pages and the corresponding information entered by a user onto those pages.

Interface IWizardBase of the code portion 320A includes a method QueryInterface() as briefly discussed above. The function QueryInterface() can be invoked via the interface IWizardBase. Pointers to the interface IWizardBase as discussed above are given to the architectural software framework 300, such as the wizard class 322 and wizard pages 324-328. Thus, any of these components can invoke the function QueryInterface() of the code portion 320A via the IWizardBase interface for exchanging information. For example, because the wizard base 320 keeps a history of previously displayed pages 320C1-320C3, the function QueryInterface() of the code port to query previously displayed pages to access information stored by those wizard pages.

The wizard base 320 manages the presentation of pages of a wizard. To display a wizard using the architectural software framework 300, the application 318 typically knows and has the unique identification of a wizard bearing identification data differentiating the wizard from other wizards known to the application 318. In addition, the application can obtain a reference to the IWizardClass interface. Using the unique identification of the wizard, the signature and identification of the IWizardClass interface, the application can obtain the desired reference to the IWizardClass interface. The application 318 passes the reference to the IWizardClass interface to the wizard base 320. This reference along with a unique identification of the wizard indicates to the wizard base 320 precisely which wizard known to the application 318 is to be presented to a user.

Figure 3C:
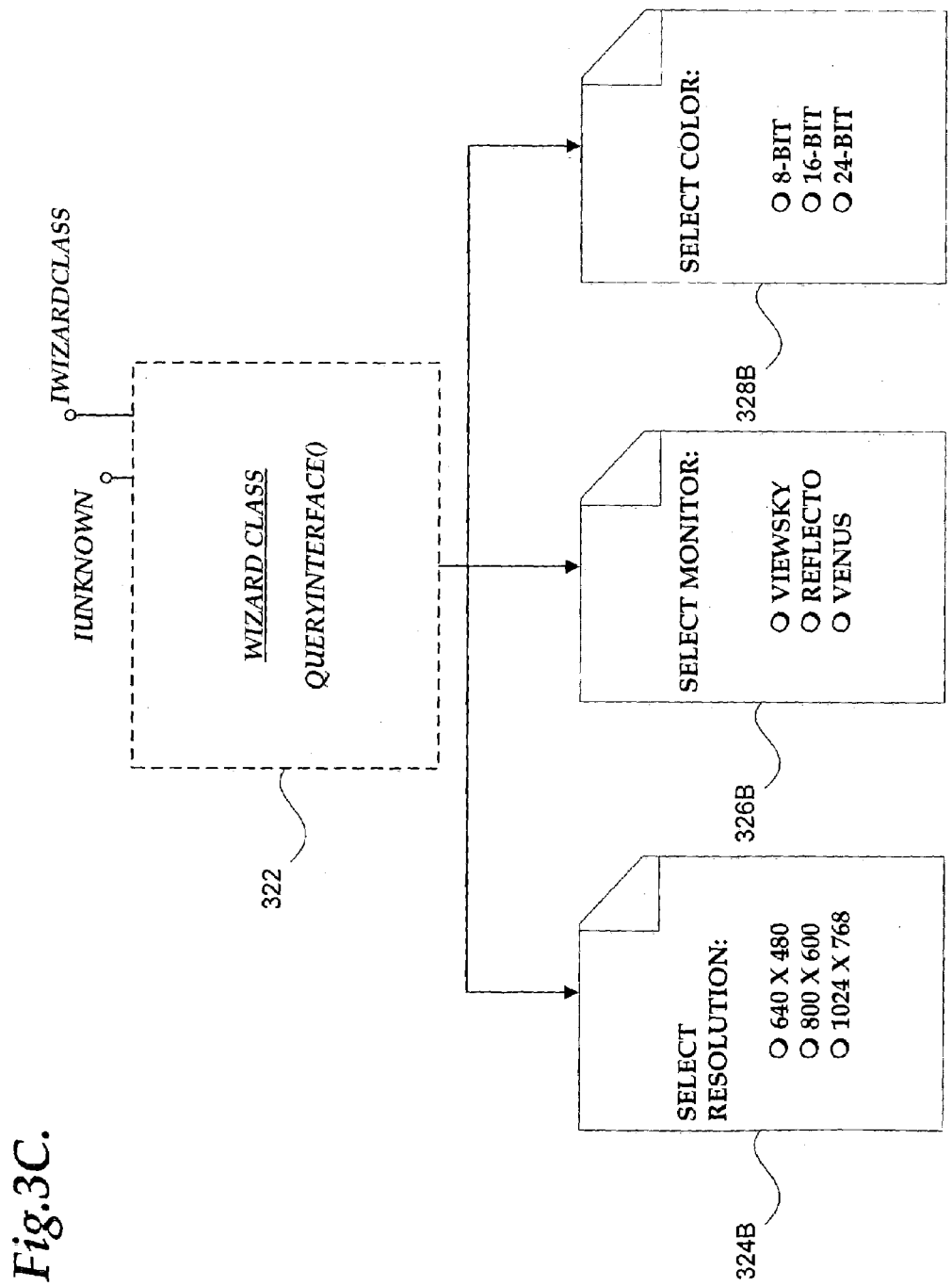
FIG. 3C is a block diagram illustrating an exemplary wizard class component instantiated from the architectural software framework.

The wizard class 322 is shown in greater detail in FIG. 3C. A wizard is basically a collection of wizard pages that are shown to a user together in a consistent fashion to guide the user through each step of a particular task. This collection of wizard pages is managed by the wizard class 322. The wizard class 322 is instantiated by a developer in order to define one particular wizard containing a set of wizard pages, such as pages 324B-328B. One of the duties of the wizard class 322 is to inform the wizard based 320 of the correct order in which to load a wizard page and to present it to a user.

To access the services of the wizard class 322, other components of the architectural software framework 300 invoke a method specified by the IWizardClass interface of the wizard class 322. Like other components of the architectural software framework 300, the wizard class 322 inherits the QueryInterface() method. Upon invocation, the QueryInterface() method returns services that the wizard class 322 supports. The QueryInterface() method of the wizard class 322 is a part of a facility that allows data or information to be exchanged among the components of the architectural software framework 300.

When the presentation of a wizard commences, the wizard base 320 asks the wizard class 322 to provide the interface of the first wizard page that is to be displayed to a user. From then on whenever the user clicks the Next button 314, the wizard base 320 asks the presently displayed page for the next page that should be displayed. If there are no additional wizard pages, the wizard base 320 then queries the wizard class 322 for the next page. When the user selects the Back button 312, the wizard base 320 will automatically display the previously presented page without having to ask the wizard class 322 for assistance. As noted above, the wizard class 322 may store information that can be accessed by components of the architectural software framework 300, such as wizard pages, or by the application 318 that launched the wizard described by the wizard class 322. These pieces of stored information are accessible by invoking the QueryInterface() of the wizard class 322.

A wizard comprises multiple wizard pages. An exemplary wizard page 308 is shown in FIG. 3D. The wizard page 308 is created by a developer to display one page among multiple pages of a wizard. Each page has a code portion and a user interface portion. With regard to the wizard page 308, the code portion is referenced as 308A and the user interface portion is referenced as 308B. Various user interface elements can be presented in the user interface portion 308B. For example, a textual description "select network server:" instructs the user to enter or to choose a certain piece of information desired by the wizard page 308. As another example, buttons, such as radio buttons, list choices ("Hanoi," "Hue," "Saigon") for the user to select. Many other suitable user interface elements can be used to entice the user to provide sufficient information in order to accomplish the wizard's task.

The code portion 308A contains a number of services, which are accessible by invoking methods declared by the IWizardPage interface. Like other components of the architectural software framework 300, the wizard page 308 inherits the QueryInterface() method. The QueryInterface() method allows the wizard page 308 to respond to an external request for the services that the wizard page provides, such as information extracted from a user and stored by the wizard page 308.

One of the duties of the wizard page 308 is to maintain the user interface elements, such as buttons and controls, on the user interface portion 308B; to provide the initial state of the user interface portion 308B when it is first presented to a user; to record the state of the user interface 308B when it is closed (such as when the user has entered desired information or completed the selection of a choice); and to store information related to the contents of the user interface portion 308B. The information that is stored by the wizard page 308 can be subsequently accessed by any components of the architectural software framework 300, such as other wizard pages, the wizard class 322, or by the application 318. The QueryInterface() method facilitates the ability of the wizard page 308 to exchange information stored and desired by other components.

FIG. 3E illustrates a wizard 301 that comprises a number of pages 324-328. The wizard 301 allows various properties of a display to be changed. The resolution of a display can be changed by using the wizard page 324. Resolution is the total number of pixels determined by the graphics mode and video adapter installed in a computer, but the size of the display depends on the size and adjustment available on a particular monitor; hence the resolution of a video display is taken as the total number of pixels displayed horizontally and vertically. A user interface portion 324B of the wizard page 324 presents three resolution options to a user for selection: "640×480", "800×600", and "1024×768". The wizard page 326 presents a number of monitor options for the user to select from. See user interface portion 326B. These selections include "Viewsky", "Reflecto", and "Venus." The wizard 301 also allows the user to change the color bits by using user interface portion 328B of the wizard page 328. Color bits are defined as a predetermined number of bits assigned to each displayable pixel (the resolution previously selected by the user via the user interface portion 324B of the wizard page 324) that determine its color when it is displayed on a monitor. For example, two color bits are required for four colors; eight color bits are required for 256 colors; and 16 color bits are required for 65,536 colors. Along with the user interface portions 324B-328B are corresponding code portions 324A-328A.

The code portion 324A includes a method SetResolution() that is invoked once the user has made a selection of the level of resolution for his display. Another method called GetResolution() can be invoked to obtain the resolution choice made by the user. As previously discussed, an interface (e.g., an interface called IScreenResolution) separate from the IWizardPage interface of the wizard page 324 can be used to access the methods SetResolution() and GetResolution(). A component that desires the data stored by the method SetResolution() would query for the IScreenResolution interface, and if found, the component would then use that interface to get the desired data by calling QetResolution(). Two functions are available via another interface (e.g., an interface called IMonitor) of the wizard page 326. A SetMonitor() method is invoked to save away the choice made by the user with respect to the monitor that he is using. The GetMonitor() method retrieves the choice made by the user when the interface portion 326B was presented to him. A component that desires the data stored by the method SetMonitor() would query for the IMonitor interface, and if found, the component would then use that interface to get the desired data by calling GetMonitor(). The wizard page 328 has a SetColor() method or function, which can be invoked, to store the selection of color bits by the user using the wizard 301. A GetColor() method of the wizard page 328 allows retrieval of the color bits selection made by the user. Again, these two methods can be accessed by another interface (e.g., an interface called IColor) implemented by the wizard page 328. A component that desires the data stored by the method SetColor() would query for the IColor interface, and if found, the component would then use that interface to get the desired data by calling GetColor().

Because wizard pages 324-328 have been instantiated from the wizard page components of the architectural software framework 300, each wizard page inherits the QueryInterface() method. As explained in detail below, using the QueryInterface() method, one wizard page can query another wizard page for information to enhance or to customize the options presented to a user so as to ease the use of the wizard 301. Upon invocation, the QueryInterface() method of the wizard page 324 returns identifiers for, the GetResolution() function and the SetResolution() function. The QueryInterface() of the wizard page 326 returns identifiers for the GetMonitor() function and SetMonitor() function when the QueryInterface() is invoked. Similarly, identifiers for GetColor() and SetColor() are returned when the QueryInterface() function of the wizard page 328 is invoked. By using one of these identifiers, a wizard page can gain access to the information being stored by a particular wizard page, thereby allowing information to be exchanged.

Figure 3F:
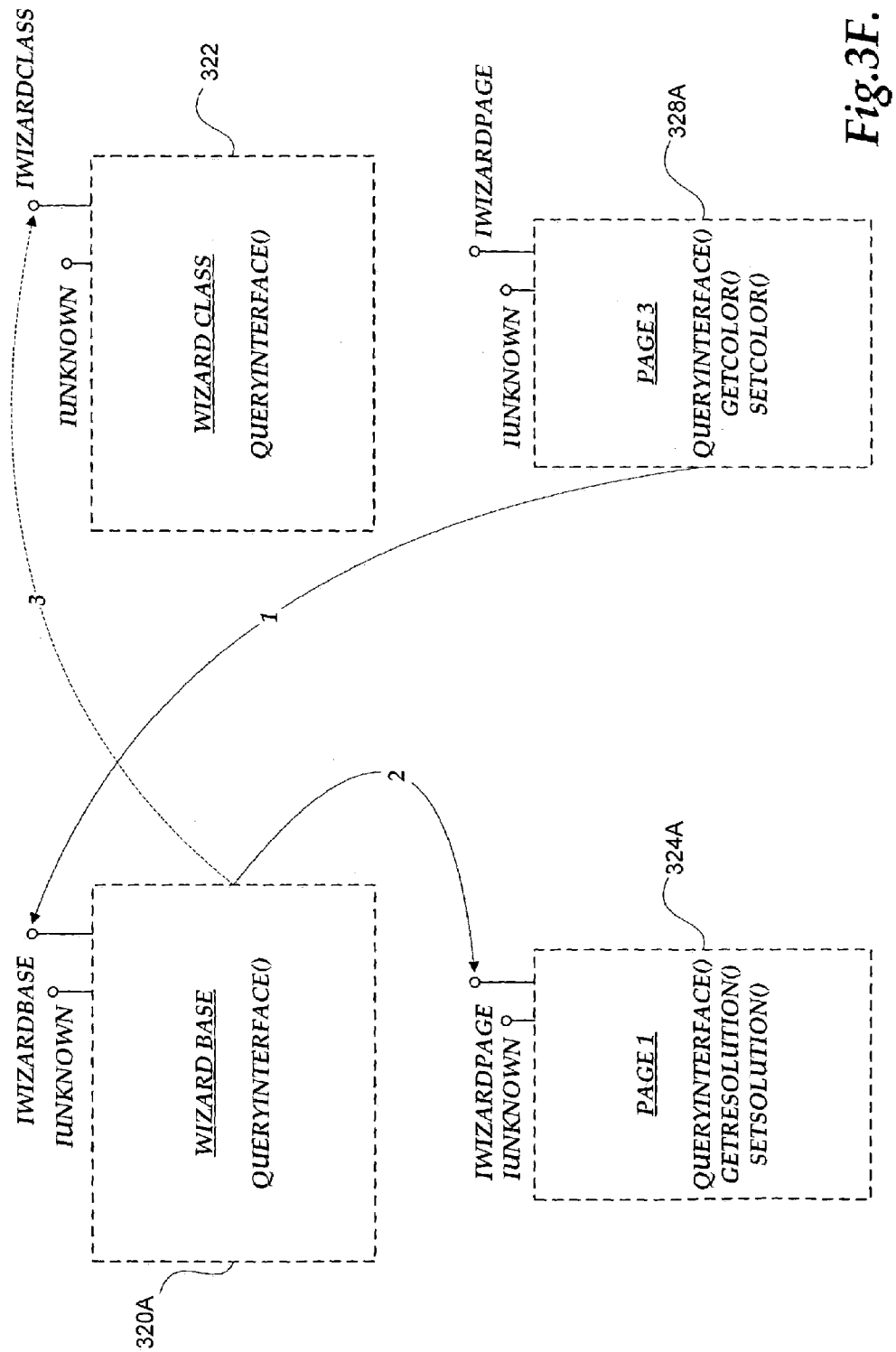
FIG. 3F is a block diagram illustrating a dynamic invocation presentation which shows an order in which information from a wizard page is exchanged with another wizard page.
Figure 4A:
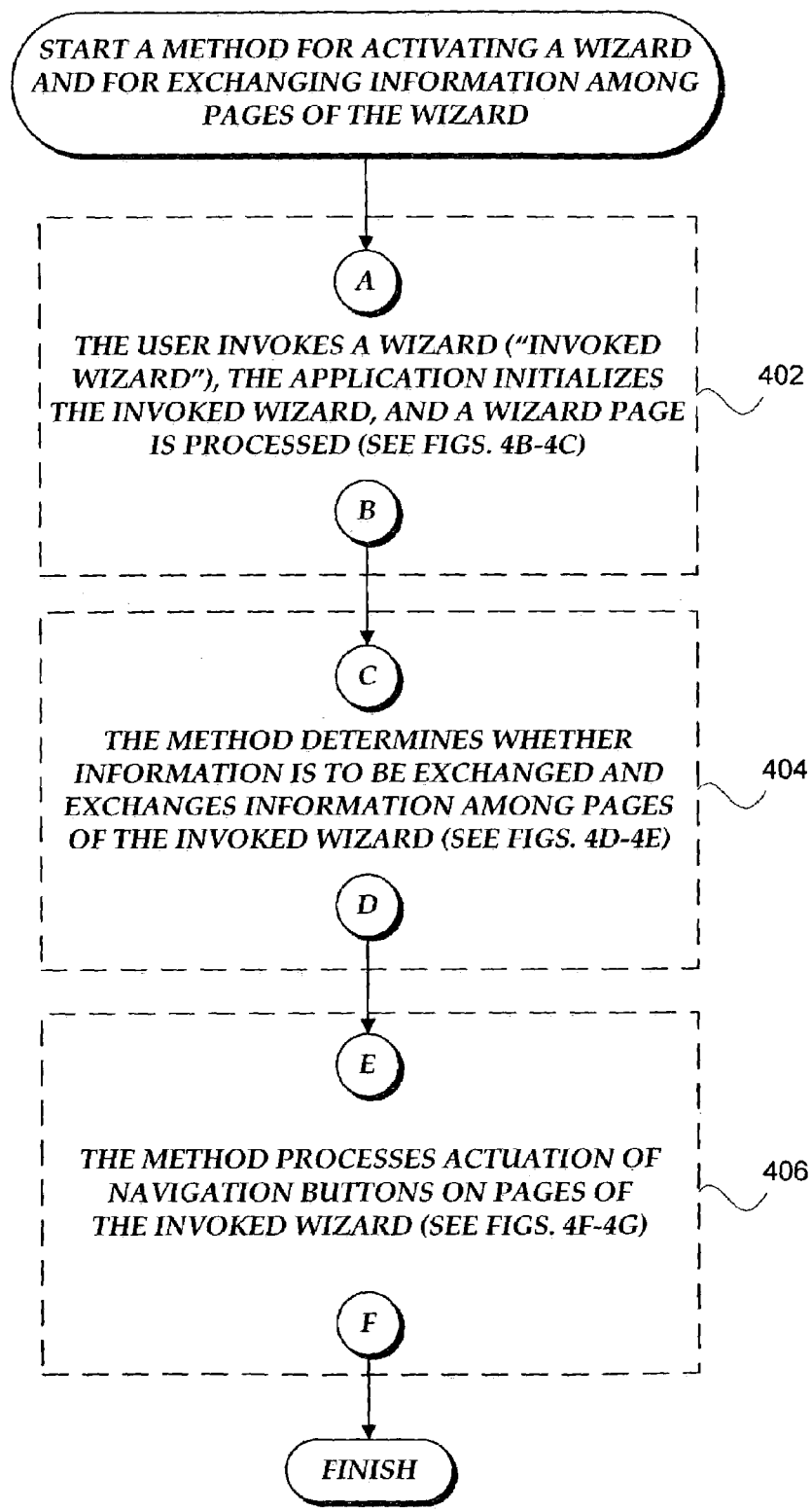
FIGS. 4A-4G are method diagrams illustrating an exemplary method formed in accordance with this invention for activating a wizard and for exchanging information among components of the wizard.
Figure 4B:
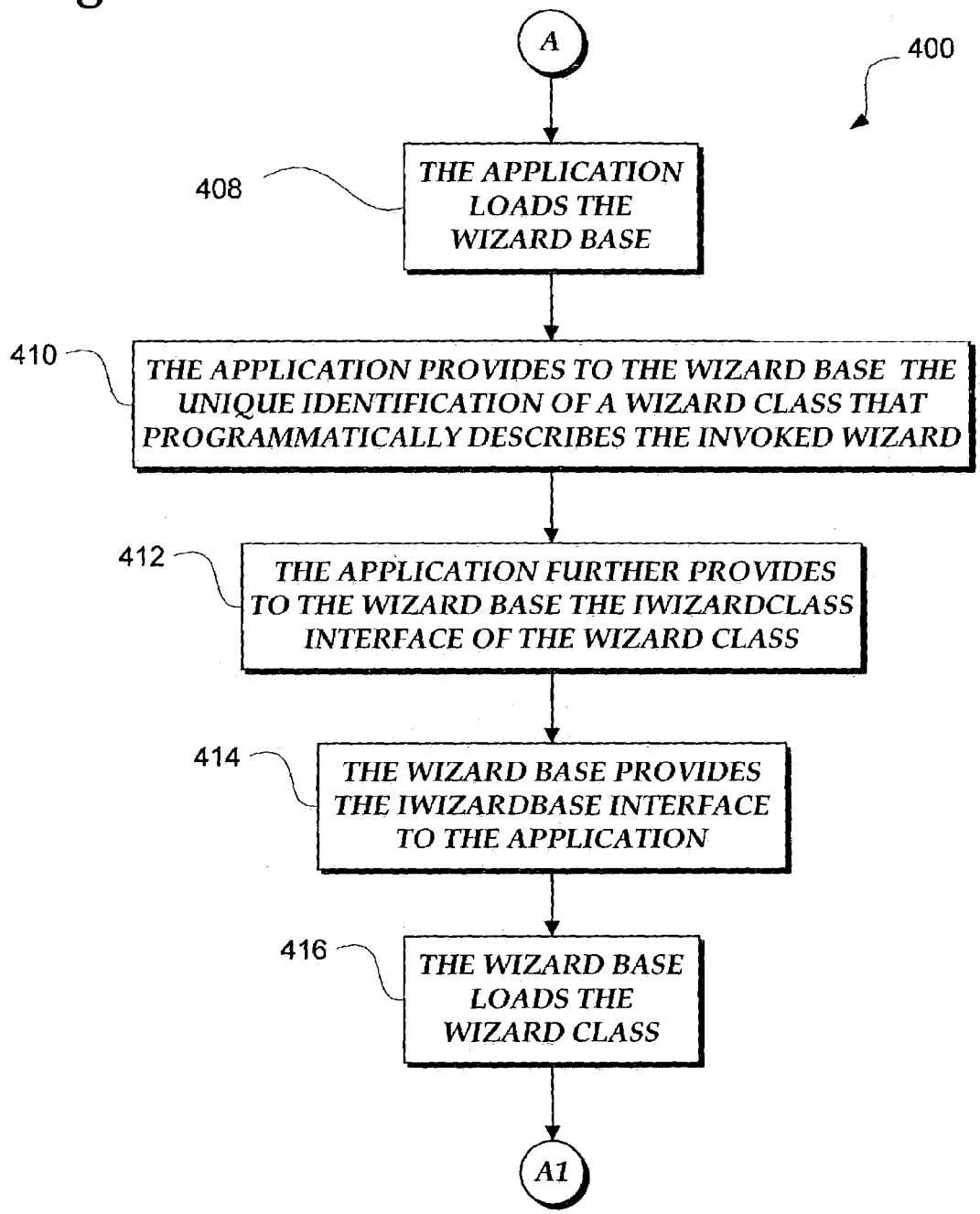
Figure 4C:
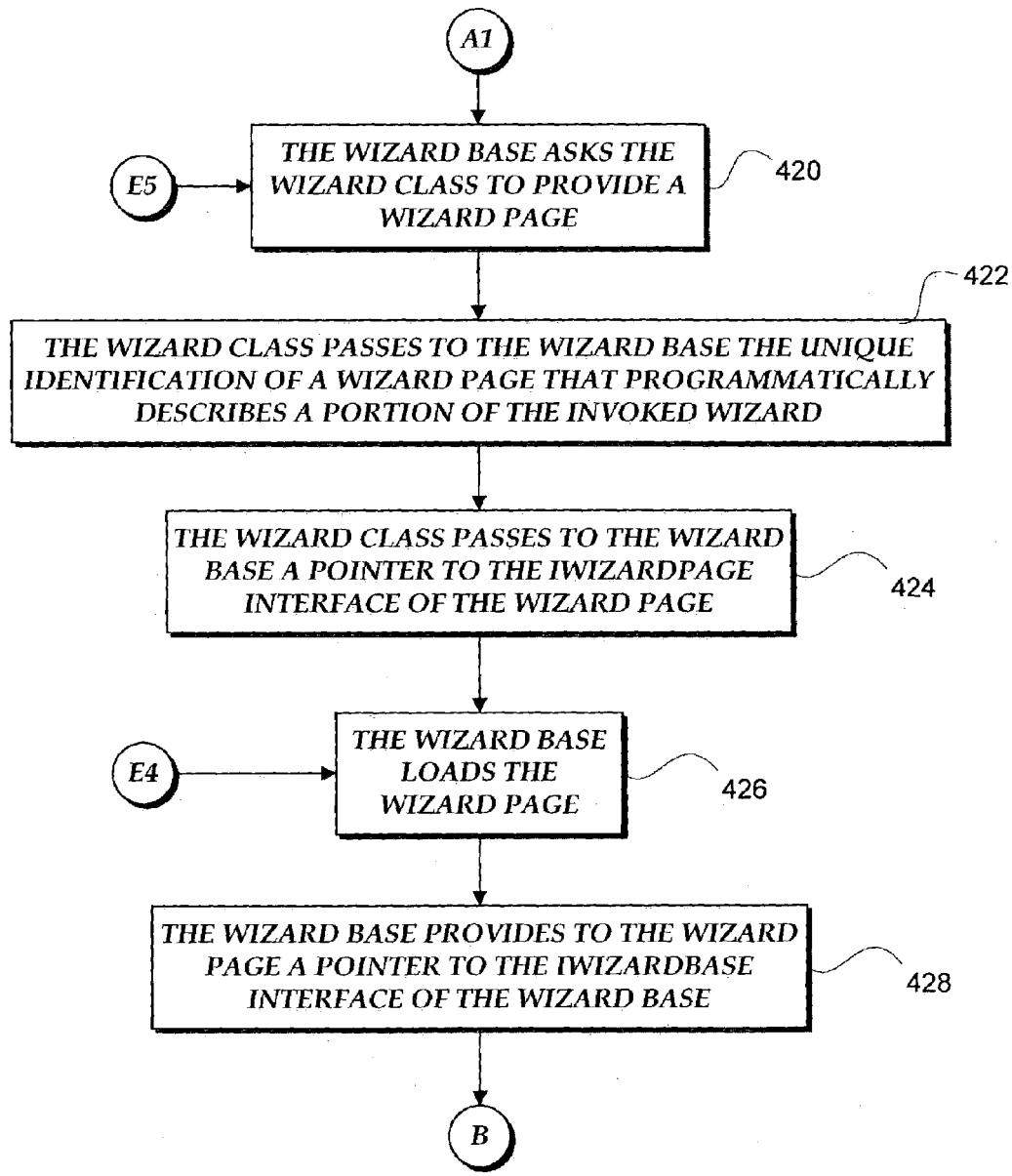
Figure 4D:
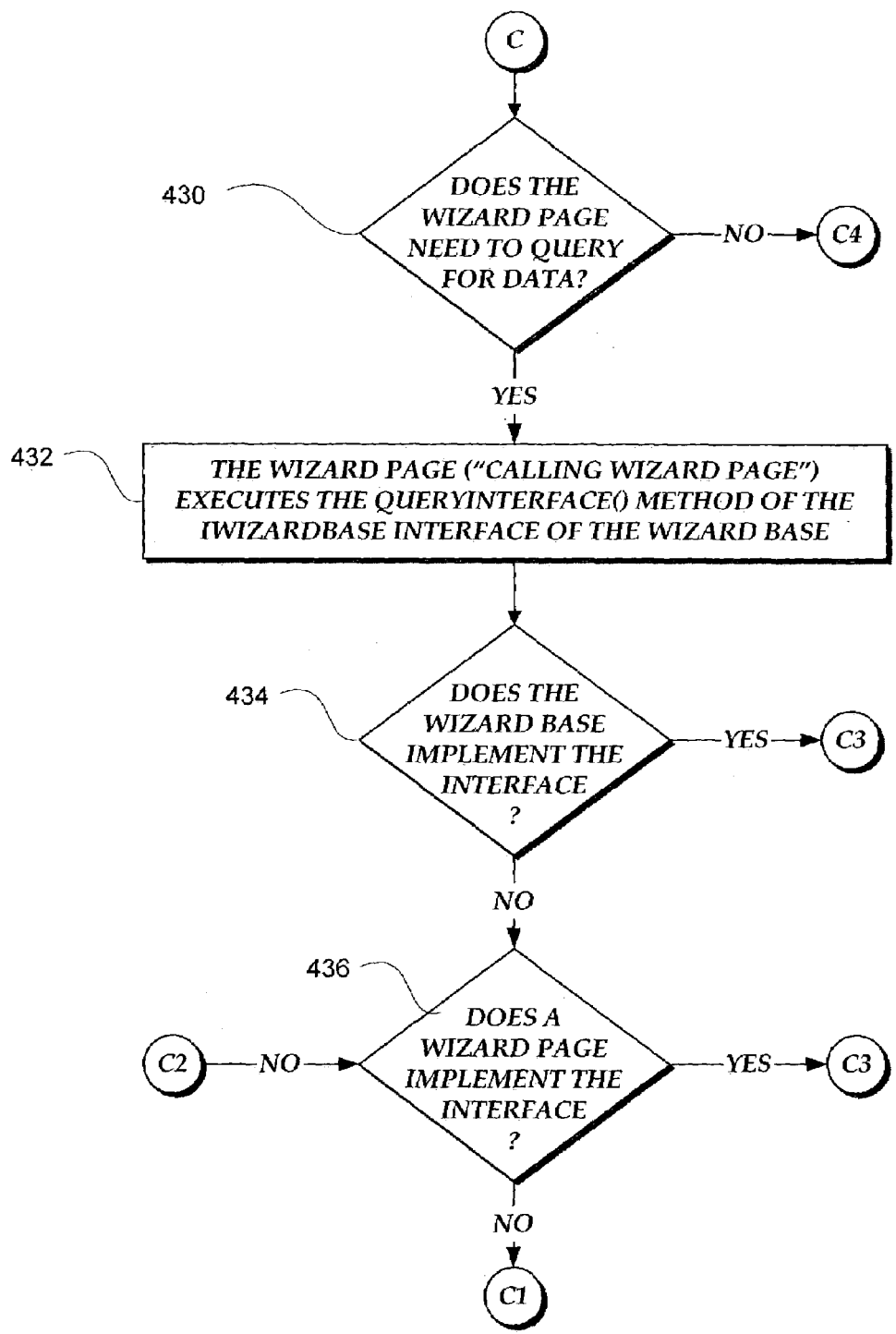
Figure 4E:
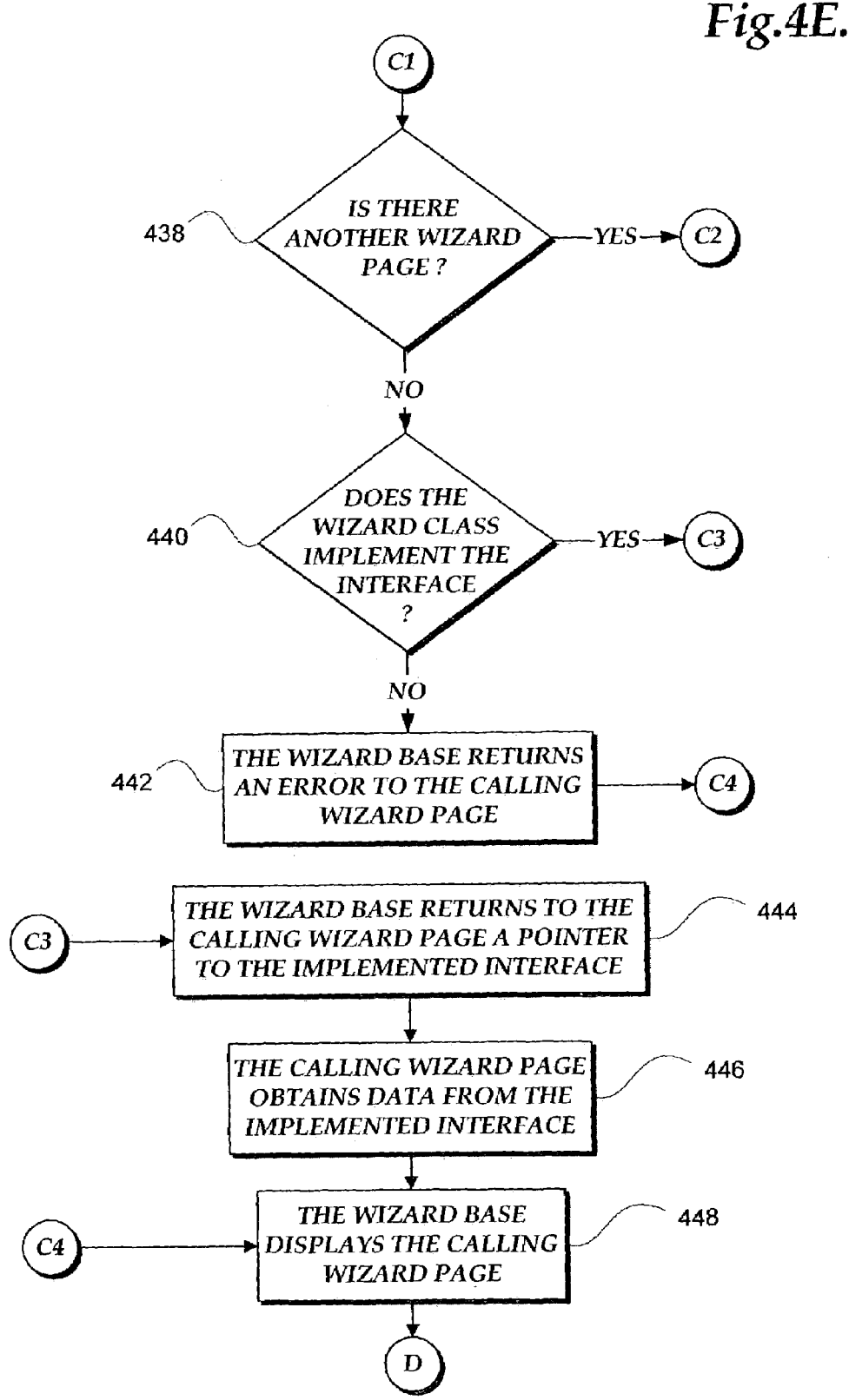
Figure 4F:
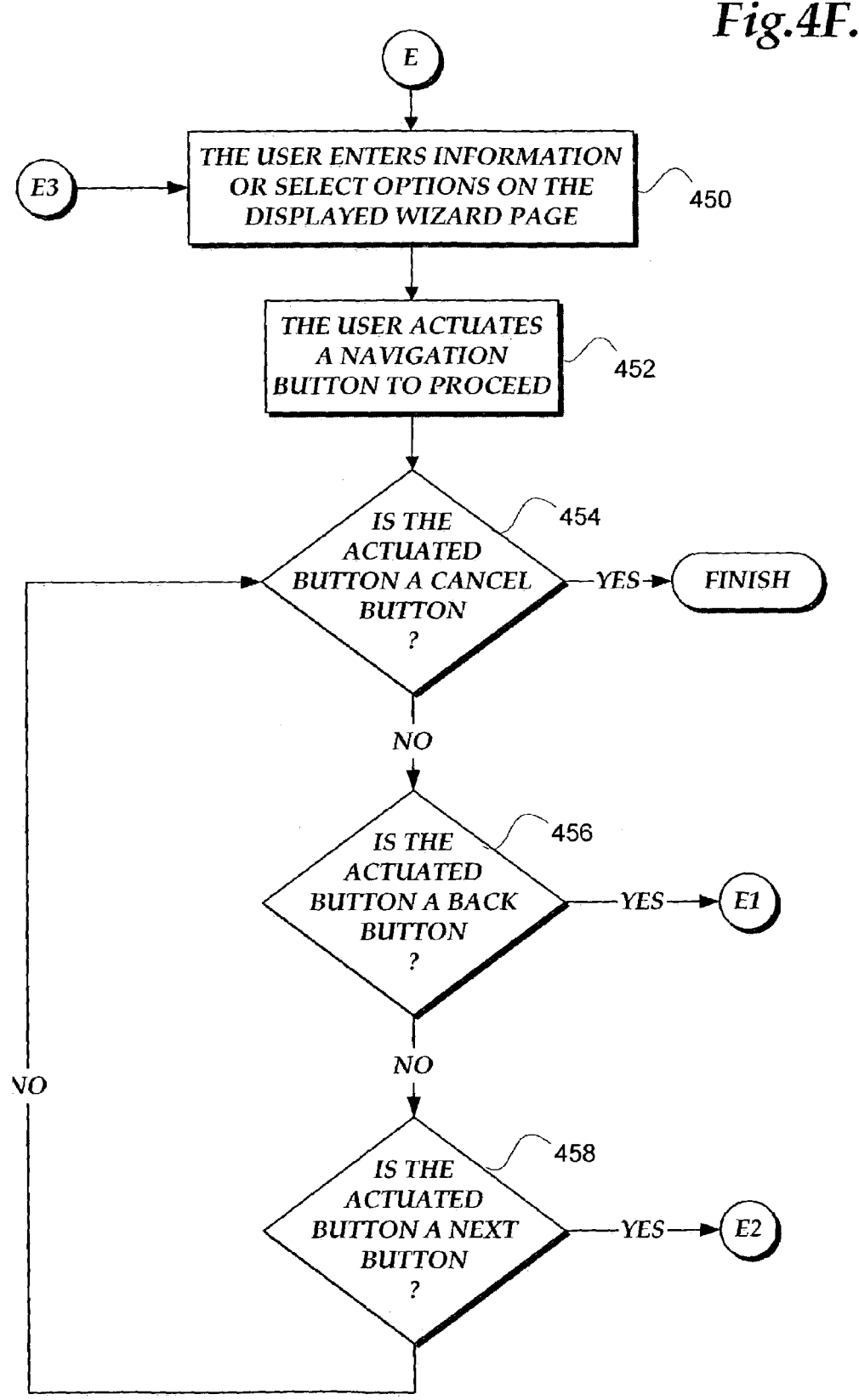
Figure 4G:
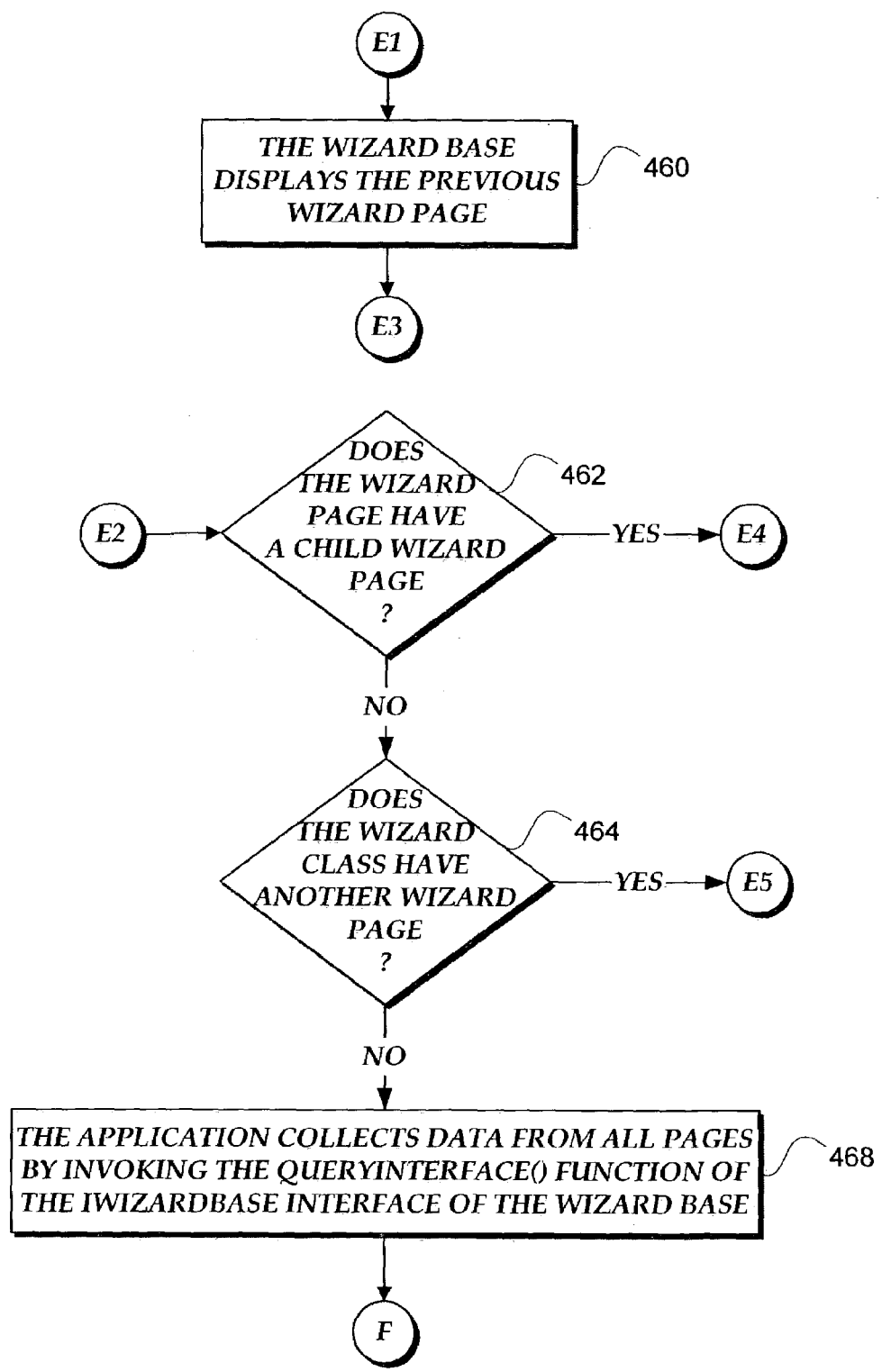

A visually dynamic presentation of the exchange of information of pages 324, 328 of the wizard 301 is shown in FIG. 3F. Also shown in FIG. 3F are code portions 320A, 322, 324A, and 328A of the wizard base 320, the wizard class 322, the wizard page 324, and the wizard page 328 so as to focus the discussion. As previously explained, the selection of color bits may be customized depending on the resolution previously selected by a user at the wizard page 324. Prior to presenting the user interface 328B of the wizard page 328, the code portion 328A of the wizard page 328 invokes the QueryInterface() function using the IWizardBase interface of the code portion 328A of the wizard base 320. The code portion 328A realizes that it needs to invoke the GetResolution() function in order to access stored information pertaining to the selected resolution by the user.

Because the wizard page 328 may not know which other wizard pages implement the GetResolution() function, in order to access the stored resolution information, the wizard page 328 invokes the QueryInterface() of the code portion 320A of the wizard base 320 via the IWizardBase interface. The wizard base 320 has knowledge of prior presented wizard pages. Using its history portion 320C and the logic of the QueryInterface() function of the code portion 320A, the wizard base 320 can step through previously presented wizard pages and invoke the QueryInterface() function of each of these pages. For example, the QueryInterface() function in the code portion 320A of the wizard base 320 accesses the IWizardPage interface of the wizard page 324 and invokes the QueryInterface() method of the code portion 324A. In response, the QueryInterface() method of the code portion 324A returns the IScreenResolution interface from which the unique identifiers or signatures of two methods GetResolution() method and SetResolution() method can be obtained. Using the unique identifiers or signatures, the code portion 328A of the wizard page 328 executes the GetResolution() method to access stored information relating to the resolution set previously by the user.

If none of the pages in the history portion 320C of the wizard base 320 implements services allowing the wizard page 328 to access resolution information, the logic of the QueryInterface() method in the code portion 320A of the wizard base 320 accesses the IWizardClass interface and invokes the QueryInterface() of the wizard class 322. If the wizard class 322 also does not implement the services required by the wizard page 328 to access resolution information, an error code is returned to the wizard page 328 signifying that an interface through which the resolution information may be accessed cannot be found.

FIGS. 4A-4G illustrate a method 400 for activating the wizard 301 and exchanging information among pages 324-328 of the wizard 301. For clarity purposes, the following description of the method 400 makes references to various elements illustrated in connection with the wizard 301 and the architectural software framework 300 shown in FIGS. 3A-3F. From a start block, the method 400 proceeds to a set of method steps 402, defined between a continuation terminal ("terminal A") and an exit terminal ("terminal B"). The set of method steps 402 describes the invocation of the wizard 301, the initialization of the wizard 301, and the processing of wizard pages.

From terminal A (FIG. 4B), the method 400 proceeds to block 408 where the application 318 loads the wizard base 320. The term "load" means that the application 318 searches a memory device, such as a hard disk drive, to find a file including a dynamic link library that contains a wizard component, such as the wizard base 320. The application 318 then pulls data structures out of the file and creates an instance of the wizard component, such as the wizard base 320. Next, the application 318 communicates with the loaded wizard base 320 to provide the unique identification of the wizard class 322 that programmatically describes the wizard 301. See block 410.

The wizard base 320 is a piece of code that runs the wizard 301. The wizard base 320 has a user interface 320B as well as a piece of code 320A that is a mechanism which reacts when a user actuates a particular button 312-316 in the wizard 301. The wizard base 320 is contained by the architectural software framework 300. It can be the only component in the architectural software framework 300 but generally other components 322-328 along with the wizard base 320 comprise the architectural software framework 300. The wizard base 320 need not be customized by a developer so that wizards created from the architectural software framework 300 have the same feel and presentation of the user interface 320B of the wizard base 320. Hence, the wizard base 320 is a generic component of the architectural software framework 300.

Returning to FIG. 4B, the application 318 provides to the wizard base 320 the IWizardClass interface of the wizard class 322. See block 412. Each wizard class is developed for a specific wizard, such as the wizard 301, that the developer wants to be executed by a user to perform a specified task. The wizard class 322 knows specifically about pages that will be displayed to the user in order to obtain information in the performance of the specified task. When the wizard base 320 receives either the unique identification of the wizard class 322 or the IWizardClass interface of the wizard class 322, the wizard base 320 has sufficient information to know the precise wizard (in this case the wizard 301) to execute.

The wizard base 320, having obtained from the application 318 the unique identification of the wizard class 322 as well as the IWizardClass interface, provides the IWizardBase interface of the wizard base 320 back to the application 318. See block 414. As will be explained in further detail below, the application 318 can use the IWizardBase interface to access information provided by the user in the course of executing the wizard 301. At block 416, the wizard base 320 loads the wizard class 322. After the wizard class 322 has been instantiated, the wizard base 320 provides the IWizardBase interface to the wizard class 322. See block 418. Next, the method 400 proceeds to another continuation terminal ("terminal A1").

From the terminal A1 (FIG. 4C), the method 400 proceeds to block 420 where the wizard base 320 asks the wizard class 322 to provide a wizard page to be displayed. The wizard class 322 internally knows the order in which the wizard pages are to be displayed. Because the wizard base 320 has obtained the IWizardClass interface, the wizard base 320 can determine via invoking the services of the wizard class 322 to obtain the first wizard page to be displayed. The wizard base 320 obtains a pointer to a wizard page to be displayed.

The wizard class 322 passes to the wizard base 320 a unique identification of a wizard page, such as pages 324-328, that programmatically describes a portion of the wizard 301. See block 422. It should be recalled that a wizard is a collection of wizard pages. The wizard class 322 passes to the wizard base 320 a pointer to the IWizardPage interface of one of the wizard pages, 324-328. See block 424. Now that the wizard base 320 has a pointer to one of the wizard pages, the wizard base 320 loads the wizard page. See block 426. The wizard base 320 also provides to the wizard page a pointer to the IWizardBase interface of the wizard base 320. See block 428. The wizard base 320 now displays the wizard page to the user for interaction. Next, the method 400 proceeds to the exit terminal B.

From the exit terminal B (FIG. 4A), the method 400 proceeds to a set of method steps 404, defined between a continuation terminal ("terminal C") and an exit terminal ("terminal D"). The set of method steps 404 determine whether information is to be exchanged and exchanges information among pages or other components of the wizard 301.

From terminal C (FIG. 4D), the method 400 proceeds to decision block 430 where the wizard page, such as the wizard page 328, determines whether it needs to query for information to display the user interface portion 328B to a user. If the answer is NO, the method 400 proceeds to another continuation terminal ("terminal C4"). Otherwise, if the answer is YES to the test at decision block 430, the method 400 proceeds to block 432 where the wizard page 328 executes the QueryInterface() method described by the IWizardBase interface of the wizard base 320.

The architectural software framework 300 allows information to be passed from one wizard page to another. Information from all wizard pages can be passed back to the application 318 that launched the wizard 301. It is desirable that wizard pages be able to read information from other wizard pages so that a wizard page can set its initial settings based upon earlier settings that the user has already entered on previously displayed wizard pages. Similarly, it is also desirable that the application 318 that launches the wizard 301 be able to read portions or all of the information that the user has entered on the presented wizard pages. Using the information, the application 318 can then carry out the operations associated with the task requested by the user. In the architectural software framework 300, the wizard class 322 is able to read information from each of the wizard pages 324-328. This allows the wizard class 322 to dynamically choose which wizard page is to be displayed when the user clicks the next button 314 based upon the settings entered by the user on the currently displayed wizard page.

As discussed above, the user interface portion 328B of the wizard page 328 may limit the options of color bits which the user can select based upon the resolution earlier chosen by the user on the wizard page 324. Returning to FIG. 4D, to facilitate the sharing of information, the architectural software framework 300 makes use of the fact that the wizard base 320, the wizard class 322, and the wizard pages 324-328 are components of the architectural software framework 300. Each component inherits the QueryInterface() method. Each component implements the QueryInterface() method individually. The QueryInterface() method returns a pointer to an interface of a component of the architectural software framework 300. In this way, one component can request a pointer to an interface in another component. When the requesting component receives this interface, the requesting component can then use the interface to call the methods within the called component. This allows the called component to provide information or services to the calling or requesting component.

Because the wizard page 328 may not know which wizard page implements the desired interface from which the wizard page 328 may access resolution information, the wizard page 328 communicates with the wizard base 320. Because the wizard base 320 is responsible for presenting wizard pages to the user, the wizard base 320 has knowledge using its history component 320C to determine whether other wizard pages implemented the desired interface.

Returning to FIG. 4D, the process 400 proceeds to another decision block 434 where the wizard base 320 determines whether it implements the interface desired by the wizard page 328. If the answer is YES to the test at decision block 434, the method 400 proceeds to another continuation terminal ("terminal C3"). Otherwise, the answer is NO, and the method 400 proceeds to another decision block. See decision block 436.

At decision block 436 the wizard base 320 invokes the QueryInterface() method of one of the pages in the history portion 320C and determines whether there is a wizard page that implements the desired interface. If the answer is YES to the test at decision block 436, the method 400 proceeds to the terminal C3. Otherwise, if the answer is NO, the method 400 proceeds to another continuation terminal ("terminal C1").

In order to facilitate the exchanging of information among wizard pages and other components of the architectural software framework 300, typically these components have access to the IWizardBase interface of the wizard base 320. The wizard base 320 provides a pointer to the IWizardBase interface to the wizard class 322, to each wizard page 324-328, and also to the application 318 that launches the wizard 301. This ensures that every component and the application has access to the IWizardBase interface, hence the ability to call back into the wizard base 320 to access the information exchanging facility. The IWizardBase interface implements the QueryInterface() method just like other components of the architectural software framework 300. Thus, other components can call the QueryInterface() method using the IWizardBase interface to get any other interfaces implemented by components of the architectural software 300. One suitable implementation includes the use of component object model (COM), but other suitable technology and languages can be used. For example, any customizable, tag-based languages, such as extensible markup language (XML), can be used.

The QueryInterface() method that is implemented by a conventional COM object returns the interface from inside the called COM object. If the COM object implements the interface, the COM object returns a pointer to the calling COM object. If the called COM object does not implement the interface, the called COM object returns an error. In various embodiments of the present invention, the QueryInterface() methods of various components of the architectural software framework 300 riot only can look for interfaces within themselves but also in other components in the architectural software framework 300, such as wizard pages 324-328 and wizard class 322.

Each wizard page 324-328 implements an IWizardPage interface which includes functions for storing and retrieving information entered by the user. Because each wizard page 324-328 implements one or more interfaces containing its information, other components can query for these interfaces in order to access the stored information for processing purposes. To query for a particular interface, a wizard page need only call or invoke the QueryInterface() method of the IWizardBase interface of the wizard base 320. The wizard base 320 then queries each wizard page, such as in an order from the most recently displayed, until the wizard base 320 finds a wizard page that implements the desired interface.

Returning to FIG. 4E, from terminal C1 (FIG. 4E), the method 400 proceeds to another decision block 438 where the wizard base 320 determines whether there are additional wizard pages in its history portion 320C to query for the desired interface. If the answer is YES to the test at decision block 438, the method 400 loops back to decision block 436 where the wizard base 320 queries another wizard page for implementation of the desired interface. Otherwise, if the answer is NO, the method 400 proceeds to another decision block. See decision block 440.

Decision block 440 is reached by the method 400 if there are no further wizard pages that the wizard base 320 can query for the desired interface. In this case, the wizard base 320 determines whether the wizard class 322 implements the desired interface. See decision block 440. If the answer is YES to the test at decision block 440, the method 400 proceeds to terminal C3. Otherwise, if the answer is NO, the method 400 proceeds to block 442 where the wizard base 320 returns an error to the wizard page 328, which is the calling wizard page. Next, the process 400 enters another continuation terminal ("terminal C4").

From terminal C3 (FIG. 4E), the method 400 proceeds to block 444 where the wizard base 320 returns to the wizard page 328 (the calling wizard page) a pointer to the desired interface IWizardPage of the wizard page 324. The wizard page 328 then invokes the GetResolution() method via the IWizardPage interface of the wizard page 324 to obtain the stored resolution information previously provided by a user. See block 446. The wizard base 320 then presents the wizard page 328 to the user with options that depend on the stored resolution information provided by the user on the wizard page 324. See block 448 (block 448 is also the destination of the terminal C4 from which the method 400 also enters block 448). Next, the method 400 proceeds to the exit terminal D.

The power of the information exchanging facility discussed above is that one wizard page can request the information it needs but it need not know where the information may have come from. This allows wizard pages that have already been developed in one wizard to be reused and placed into new wizards. For example, the wizard page 328 can be reused in another wizard that requests the user to select one of many color bit choices. Recall that the wizard page 328 needs information pertaining to resolution. It is possible that in a new wizard no wizard pages of the new wizard implements an interface allowing the wizard page 328 to access resolution information. In this case, the services of the wizard page 324, which include the GetResolution() method, can be placed with the wizard class 322 in the new wizard. When the wizard page 328 queries the wizard base 320 for the GetResolution() method, the wizard base 320 eventually queries the wizard class 322, which implements the GetResolution() method, and returns some sort of default resolution values back to the wizard page 328. This reusability allows wizard pages to be plugged into entirely new wizard configurations and it allows wizard pages and wizard classes to retrieve information from one another without even necessarily knowing from which component they are receiving the information. If the information exists somewhere that is accessible by a service of an interface, a component of the architectural software framework 300 can access the stored information.

Returning to FIG. 4A, from exit terminal D, the method 400 proceeds to a set of method steps 406, defined between a continuation terminal ("terminal E") and an exit terminal ("terminal F"). The set of method steps 406 processes actuation of navigation buttons 312-316 on the user interface portion 320B of the wizard base 320.

From terminal E (FIG. 4F), the method 400 proceeds to block 450 where the wizard base 320 waits for the user to enter information or select options on the displayed wizard page. The user then actuates a navigation button 312-316 to proceed. See block 452. Next, the method 400 enters another decision block 454 where it is determined whether the actuated navigation button is a Cancel button 316. If the answer is YES to the test at decision block 454, the process 400 terminates, hence closing the wizard 301, and returns back to the application 318 that invoked the wizard 301. Otherwise, if the answer is NO, the process 400 proceeds to another decision block 456 where it is determined whether the actuated button is the Back button 312. If the answer is YES, the process 400 proceeds to another continuation terminal ("terminal E1"). If the answer is NO, the process 400 proceeds to another decision block. See decision block 458.

At decision block 458, it is determined whether the actuated button is the Next button 314. If the answer to the test at decision block 458 is YES, the method 400 proceeds to another continuation terminal ("terminal E2"). Otherwise, the answer is NO, and the method 400 loops back to decision block 454 to execute the tests at decision blocks 454-458 again.

From terminal E1 (FIG. 4G), the method 400 proceeds to block 460 where the wizard base 320 displays the previous wizard page using its history portion 320C. From block 460, the process 400 proceeds to another continuation terminal ("terminal E3"). From terminal E3 (FIG. 4F), the process 400 loops back to block 450 enabling the user to enter new information or select a new option on the previously displayed wizard page.

From terminal E2 (FIG. 4G), the method 400 proceeds to another decision block, which determines whether the presently displayed wizard page has a child wizard page to be displayed to the user. See decision block 462. If the answer to the test at decision block 462 is YES, the method 400 proceeds to another continuation terminal ("terminal E4"). From terminal E4 (FIG. 4C), the method 400 loops back to block 426 to allow presentation of the child wizard page. If the answer is NO to the test at decision block 462, another decision block is entered by the method 400. See decision block 464. At this decision block, it is determined whether the wizard class 322 has another wizard page to be displayed to the user. If the answer to the test at decision block 464 is YES, the method 400 proceeds to another continuation terminal ("terminal E5"). From terminal E5, the method 400 loops back to block 420 where the wizard base once again asks the wizard class 322 to provide another wizard page to be displayed to the user.

Returning to FIG. 4G, if the answer to the test at decision block 464 is NO signifying that no more wizard pages need be shown to the user, the wizard 301 terminates, and the application 318 collects information from all presented wizard pages of the wizard 301 by invoking the QueryInterface() method of the wizard base 320 (via the IWizardBase interface). See block 468. From here, the process 400 enters the exit terminal F. From exit terminal F (FIG. 4A), the method 400 terminates execution.

While the preferred embodiment of the invention has been illustrated and described, it will be appreciated that various The embodiments of the invention in which an exclusive property or privilege is claimed are defined as follows:

1. A computer-implemented system on which a wizard is executed for guiding a user through a task, comprising:

a plurality of wizard pages executing on hardware of the computer-implemented system, including a first wizard page, previously presented to the user, one or more of the plurality of wizard pages implementing respective interfaces comprising respective sets of one or more methods implemented by the plurality of wizard pages for accessing stored information provided by the user by interaction with the plurality of wizard pages; and a second wizard page to be presented to the user that is also executing on the hardware of the computer-implemented system, the second wizard page querying the wizard for a particular type of interface, and in response to the query of the second wizard page the wizard querying the plurality of wizard pages to find a wizard page that implements the particular type of interface, the wizard returning to the second wizard page a reference to a wizard page, which the second wizard page does not know that it is the first wizard page, found to implement the particular type of interface, the second wizard page using the reference to invoke a method of the found wizard page to access a portion of the stored information and using that portion to customize presentation of the second wizard page to the user.

2. The computer-implemented system of claim 1, wherein the first wizard page includes a user interface portion through which the user provides the stored information relating to the task.

3. The computer-implemented system of claim 2, wherein the second wizard page includes a user interface portion, the presentation of the user interface portion of the second wizard page being customizable based on the stored information.

4. The computer-implemented system of claim 3, wherein the first wizard page includes a code portion that contains an interface to a set of methods, the method in the set of methods being invokable to return references to the remaining method in the set of methods.

5. The computer-implemented system of claim 4, wherein the second wizard page includes a code portion, the code portion of the second wizard page being capable of querying the wizard for references to the remaining method in the set of methods of the first wizard page to customize the user interface portion of the second wizard page.

6. A computer-implemented system on which an interactive wizard executes comprising wizard pages for guiding a user through a task, the wizard pages having respective settings and user interfaces for setting the settings, the wizard pages implementing respective programmatic interfaces comprising methods for setting and/or getting their settings, the wizard comprising:

a wizard base executing on hardware of the computer-implemented system that includes a history of previously presented wizard pages, the wizard base responding to a query by any wizard page, an application that invoked the wizard, or the wizard itself for a particular type of programmatic interface that can be used to access stored information previously provided by the user; and a wizard page executing on the hardware of the computer-implemented system to be presented to the user, the wizard page invoking a method implemented by another wizard page, which is not known to the wizard page; using a reference found by the wizard base, the reference being found by the wizard base by querying an interface supported by the wizard base and any of the previously presented wizard pages known to the wizard base for the particular type of programmatic interface thereby allowing access to the stored information for customizing the wizard page prior to presentation to the user.

7. The computer-implemented system of claim 6, wherein previously presented wizard pages in the history include query methods, each query method of previously presented wizard pages being invokable by a query method of the wizard base to return an interface supported by a corresponding previously presented wizard page.

8. The computer-implemented system of claim 7, wherein the wizard base includes a wizard base interface whose reference is given to the wizard page that is to be presented to the user, the wizard base interface being invokable by the wizard page that is to be presented to the user to invoke the query method of the wizard base.

9. The computer-implemented system of claim 8, wherein the wizard base includes a user interface portion, the user interface portion including an area for presenting a wizard page to the user, a navigation facility to move forward and backward through a set of wizard pages, and a facility to cancel the interactive help utility.

10. The computer-implemented system of claim 9, wherein each previously presented wizard pages includes a wizard page interface, the wizard base invoking the query method of a previously presented page via a corresponding wizard page interface.

11. A computer-implemented system on which an architectural software framework executes for facilitating the exchange of information among components of an interactive help utility, comprising:

a wizard class executing on hardware of the computer-implemented system for defining an order in which to display wizard pages, the wizard class including a particular type of interface for returning a set of methods implemented by the wizard class;

a wizard page executing on the hardware of the computer-implemented system to be presented to the user, the wizard page being customizable when one or more presented wizard pages are accessed to obtain stored information without the use of a common database; and a wizard base executing on the hardware of the computer-implemented system that includes a particular type of interface for querying the presented wizard pages, the particular type of interface of the wizard base being invokable by the wizard page to access the presented wizard pages to obtain stored information without the use of a common database and without having knowledge of any of the presented wizard pages, the wizard base invoking the particular type of interface supported by the wizard base and any other particular type of interface known to the wizard base including the particular type of interface of the wizard class to find an access method of the set of methods implemented by the wizard class if the access method cannot be found among the presented wizard pages to obtain stored information without the use of a common database.

12. The framework computer-implemented system of claim 11, wherein the wizard class includes a wizard class interface, a reference to the wizard class interface being used by the wizard base to invoke a query method of the wizard class.

13. The computer-implemented system of claim 12, wherein each presented wizard page includes a wizard page interface, a reference to the wizard page interface being used by the wizard base to find an access method.

14. The computer-implemented system of claim 13, wherein the wizard base includes a wizard base interface, a reference to the wizard base interface being used by the wizard base to invoke a query method of the wizard base.

15. The computer-implemented system of claim 14, wherein the wizard page to be presented to the user includes a user interface that is customizable depending on the stored information that is obtained via the invocation of the access method of a presented wizard page.

16. A computer-implemented method for facilitating the exchange of information among components of an interactive wizard to guide a user through a task, comprising:
    querying a wizard base by a wizard page, an application that invoked the wizard, or the wizard itself for a particular type of programmatic interface that can be used to access stored information so as to customize options presented by the wizard page to the user; and
    invoking a method implemented by another wizard page, which is not known to the wizard page using a reference found by the wizard base, the reference being found by the wizard base by querying an interface supported by the wizard base and any of previously presented wizard pages known to the wizard, base for the particular type of programmatic interface to access the stored information.

17. The method of claim 16, wherein querying includes querying the wizard base to determine whether the wizard base implements the particular type of programmatic interface prior to querying previously presented wizard pages.

18. The method of claim 17, wherein querying includes querying a wizard class to determine whether the wizard class implements the particular type of programmatic interface when the particular type of programmatic interface is not implemented by previously presented wizard pages.

19. The method of claim 16, further comprising returning to the wizard page the reference to the method when the method is found by the wizard base by querying previously presented wizard pages.

20. The method of claim 19, further comprising presenting the wizard page to the user with customized options based on the stored information that is accessible by the method found by the wizard base.

21. The method of claim 16, further comprising collecting information from previously presented wizard pages by an application from which the interactive wizard was launched, the act of collecting including executing the act of querying the wizard base.

22. A computer-implemented method for exchanging information in a wizard, comprising:
    storing in a history a plurality of wizard pages, including a first wizard page, previously presented to a user, one or more of the plurality of the wizard pages implementing respective interfaces comprising respective sets of one or more methods implemented by the plurality of wizard pages for accessing stored information provided by the user by interaction with the plurality of wizard pages; and
    querying the wizard by a second wizard page that is to be presented to the user for a particular type of interface, in response to the query of the second wizard page the wizard querying the plurality of wizard pages including the first wizard page to find a wizard page that implements the particular type of interface, the wizard returning to the second wizard page a reference to a wizard page, which the second wizard page does not know that it is the first wizard page, found to implement the particular type of interface, the second wizard page using the reference to invoke a method of the found first wizard page to access a portion of the stored information and using that portion to customize the presentation of the second wizard page to the user.

23. The method of claim 22, wherein the first wizard page includes a user interface portion through which the user provides the stored information relating to the task.

24. The method of claim 22, wherein the second wizard page includes a user interface portion, the presentation of the user interface portion of the second wizard page being customizable based on the stored information.

25. The method of claim 24, wherein the first wizard page includes a code portion that contains an interface to a set of methods, a method in the set of methods being invokable to return references to the remaining methods in the set of methods.

26. The method of claim 25, wherein the second wizard page includes a code portion, the code portion of the second wizard page being capable of querying the wizard for references to the remaining methods in the set of methods of the first wizard page to customize the user interface portion of the second wizard page.

27. A computer-implemented method for exchanging information in an interactive wizard, comprising:
    storing previously presented wizard pages in a history by a wizard base, the wizard base responding to a query by any wizard page, an application that invoked the interactive wizard, or the interactive wizard itself for a particular type of programmatic interface that can be used to access stored information previously provided by the user; and
    querying the wizard base by a wizard page that is to be presented to a user, the wizard page invoking a method implemented by another wizard page, which is not known to the wizard page, using a reference found by the wizard base, the reference being found by the wizard base by querying an interface supported by the wizard base and any of the previously presented wizard pages known to the wizard base for the particular type of programmatic interface thereby allowing access to the stored information for customizing the wizard page prior to presentation to the user.

28. The method of claim 27, wherein previously presented wizard pages in the history include query methods, each query method of previously presented wizard pages being invokable by the wizard base to return an interface supported by a corresponding previously presented wizard page.

29. The method of claim 28, wherein the wizard base includes a wizard base interface whose reference is given to the wizard page that is to be presented to the user, the wizard base interface being invokable by the wizard page that is to be presented to the user to invoke the query method of the wizard base.

30. The method of claim 29, wherein the wizard base includes a user interface portion, the user interface portion including an area for presenting a wizard page to the user, a navigation facility to move forward and backward through a set of wizard pages, and a facility to cancel the interactive help utility.

31. The method of claim 30, wherein each previously presented wizard pages includes a wizard page interface, the wizard base invoking the query method of a previously presented page via a corresponding wizard page interface.

32. A computer-implemented method for facilitating the exchange of information among components of an interactive wizard, comprising:
- loading a wizard class that defines the order in which to display wizard pages, the wizard class including a particular type of interface for returning a set of methods implemented by the wizard class;
- loading a wizard page to be presented to the user, the wizard page being customizable when one or more presented wizard pages are accessed to obtain stored information; and
- querying a wizard base by the wizard page, the wizard base including a particular type of interface for querying the presented wizard pages, the particular type of interface of the wizard base being invokable by the wizard page to access the presented wizard pages to obtain stored information without having knowledge of any of the presented wizard pages, the wizard base invoking the particular type of interface supported by the wizard base and any other particular type of interface known to the wizard base including the particular type of interface of the wizard class to find an access method of the set of methods implemented by the wizard class if the access method cannot be found among the presented wizard pages to obtain stored information.

33. The method of claim 32, wherein the wizard class includes a wizard class interface, a reference to the wizard class interface being used by the wizard base to invoke a query method of the wizard class.

34. The method of claim 33, wherein each presented wizard pages includes a wizard page interface, a reference to the wizard page interface being used by the wizard base to find the access method.

35. The method of claim 34, wherein the wizard base includes a wizard base interface, a reference to the wizard base interface being used by the wizard base to invoke the query method of the wizard base.

36. The method of claim 35, wherein the wizard page to be presented to the user includes a user interface that is customizable depending on the stored information that is obtained via the invocation of the access method of a presented wizard page.

* * * * *